Aug. 22, 1961  L. G. GITZENDANNER  2,997,294
APPARATUS FOR FEEDING, CUTTING AND STACKING
MATERIAL FOR CAPACITORS
Filed Sept. 15, 1955  13 Sheets-Sheet 1
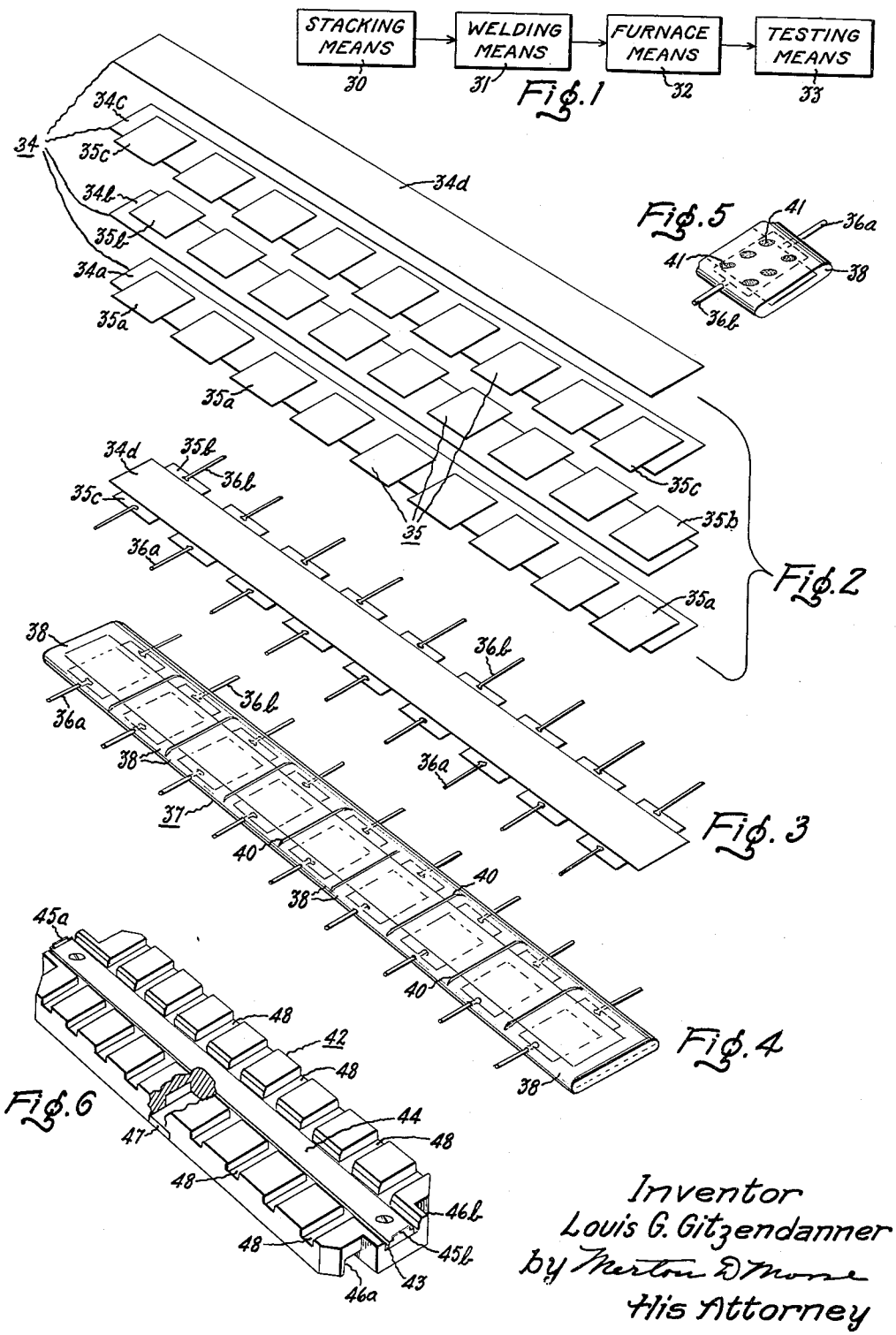
Inventor
Louis G. Gitzendanner
by Merton D. Morse
His Attorney

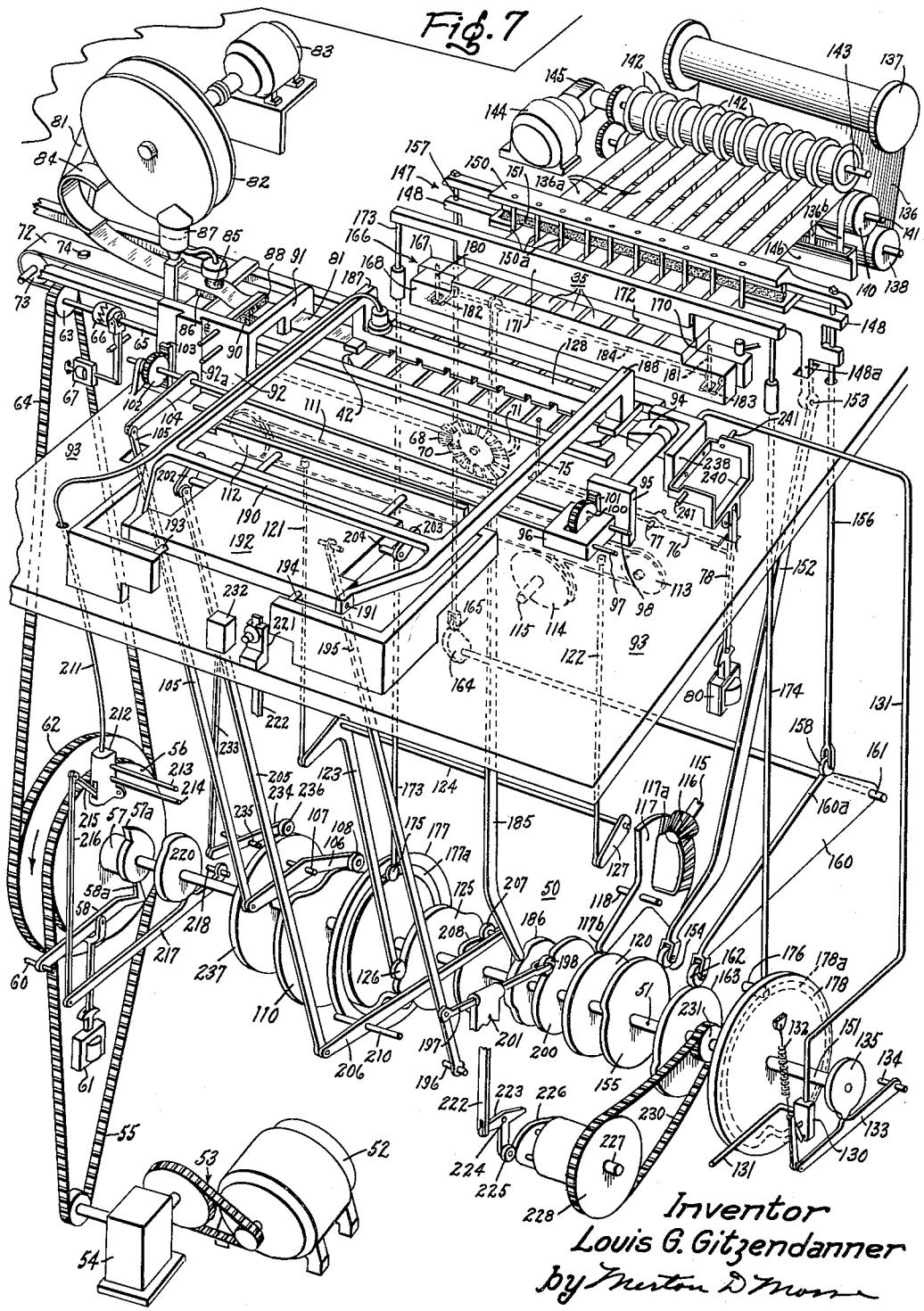

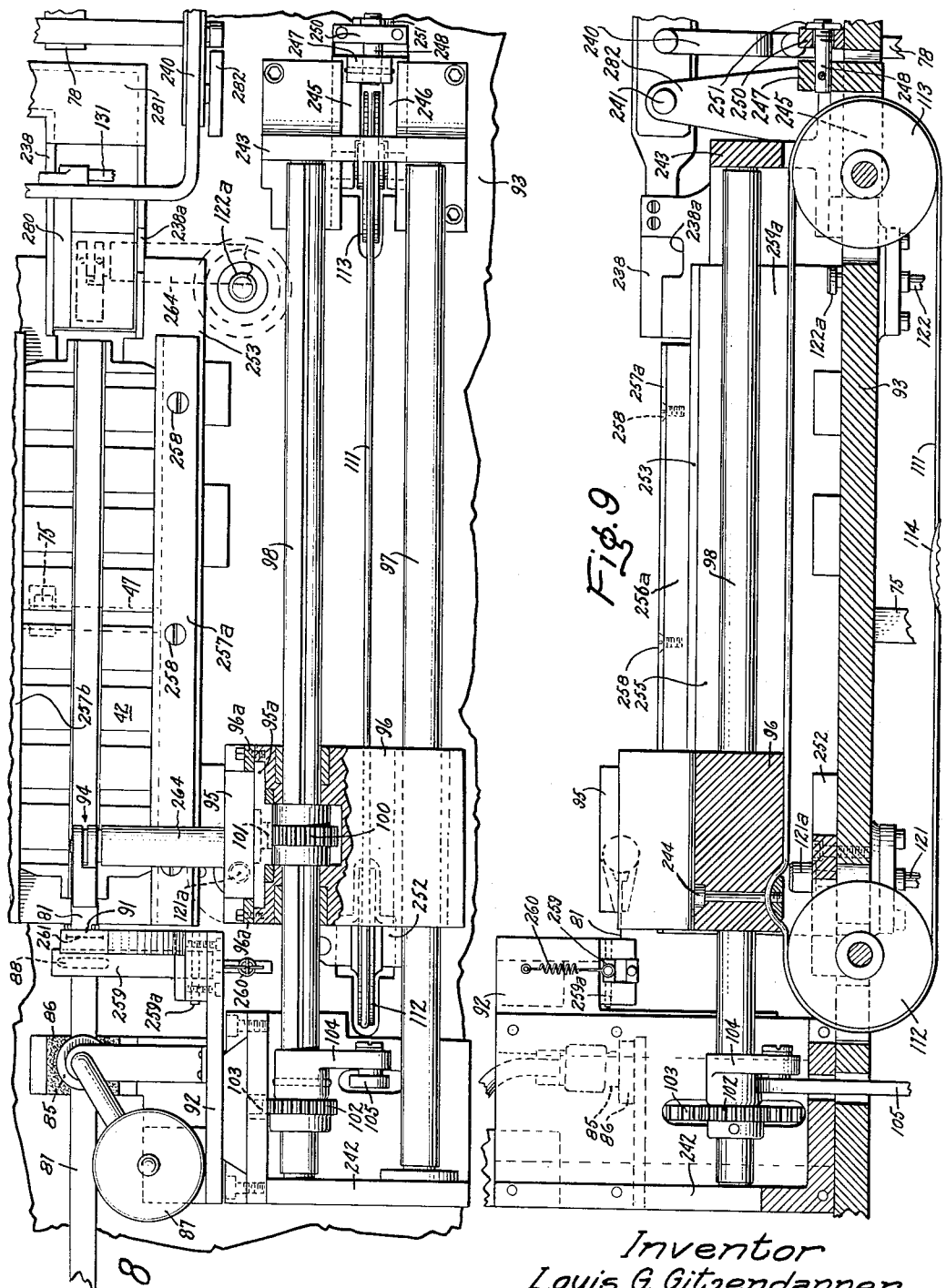

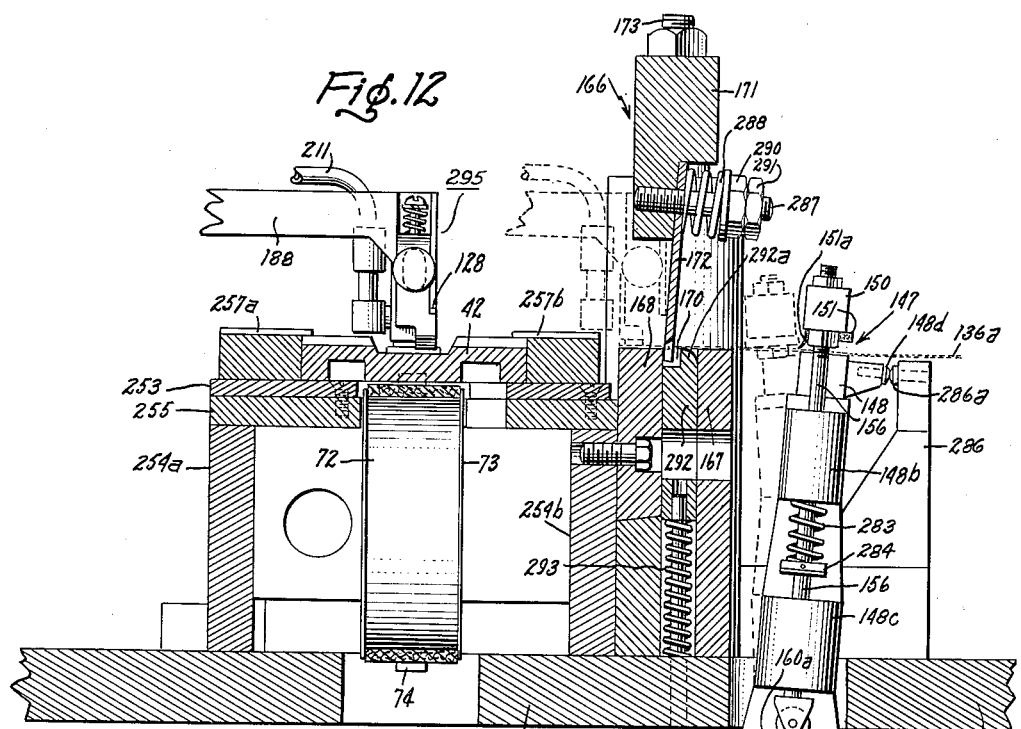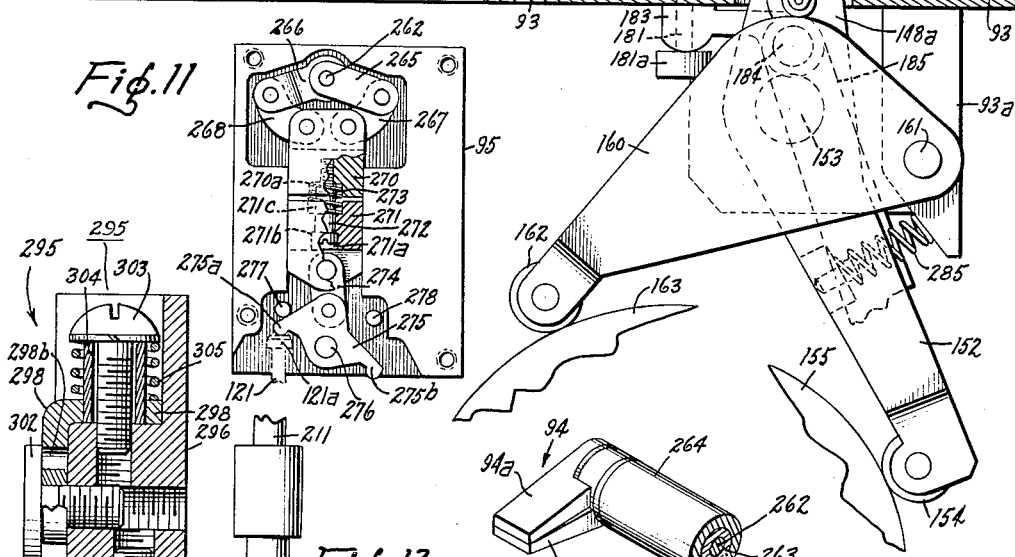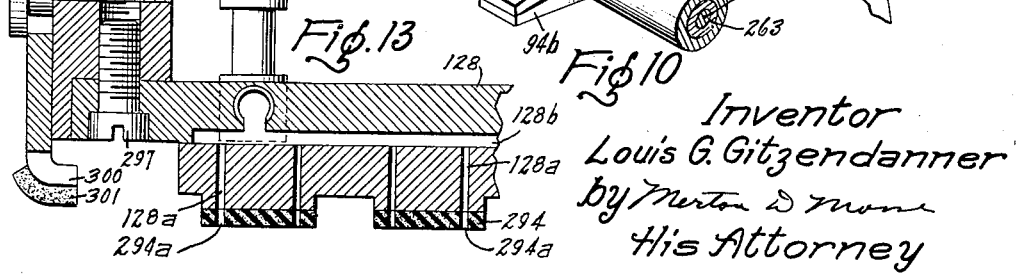

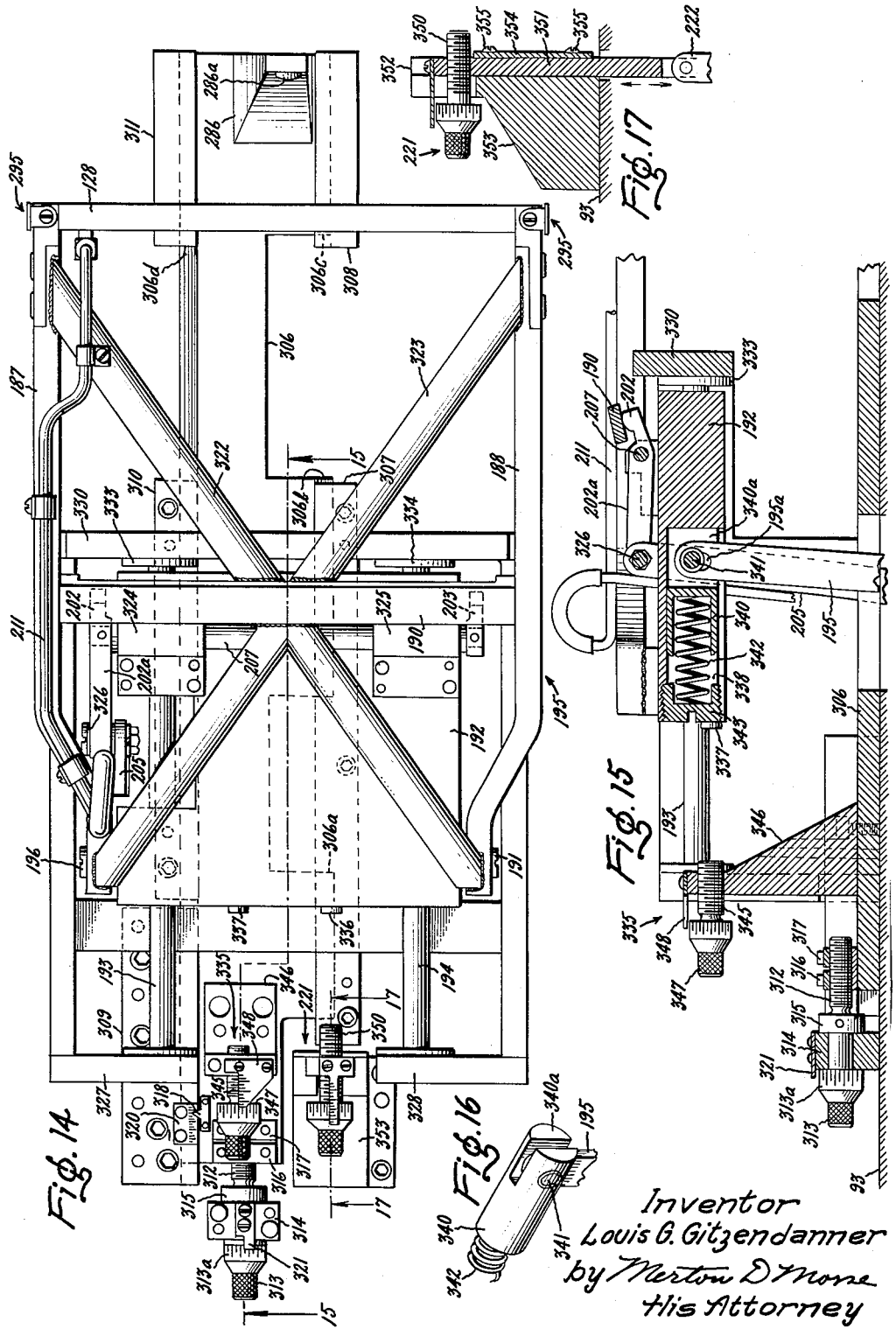

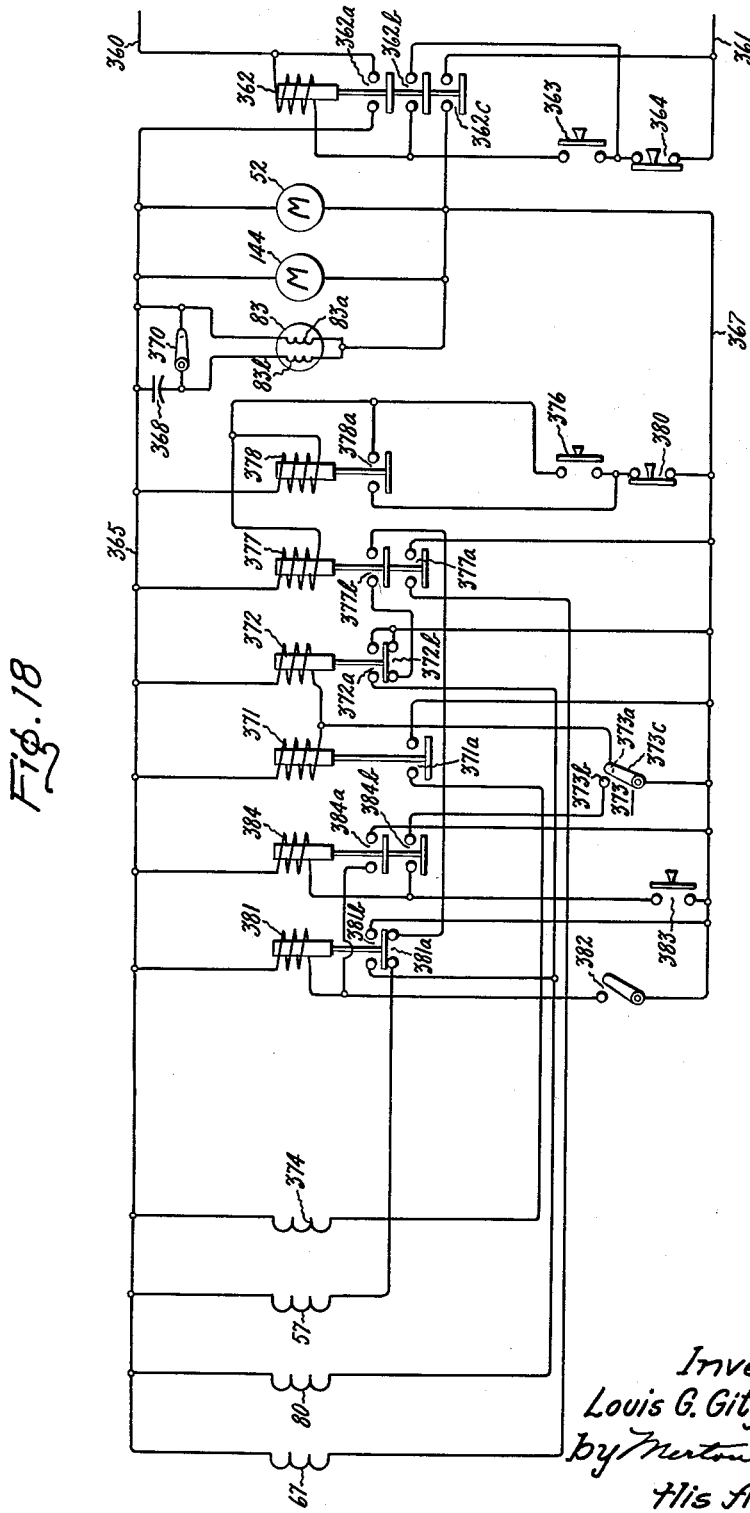

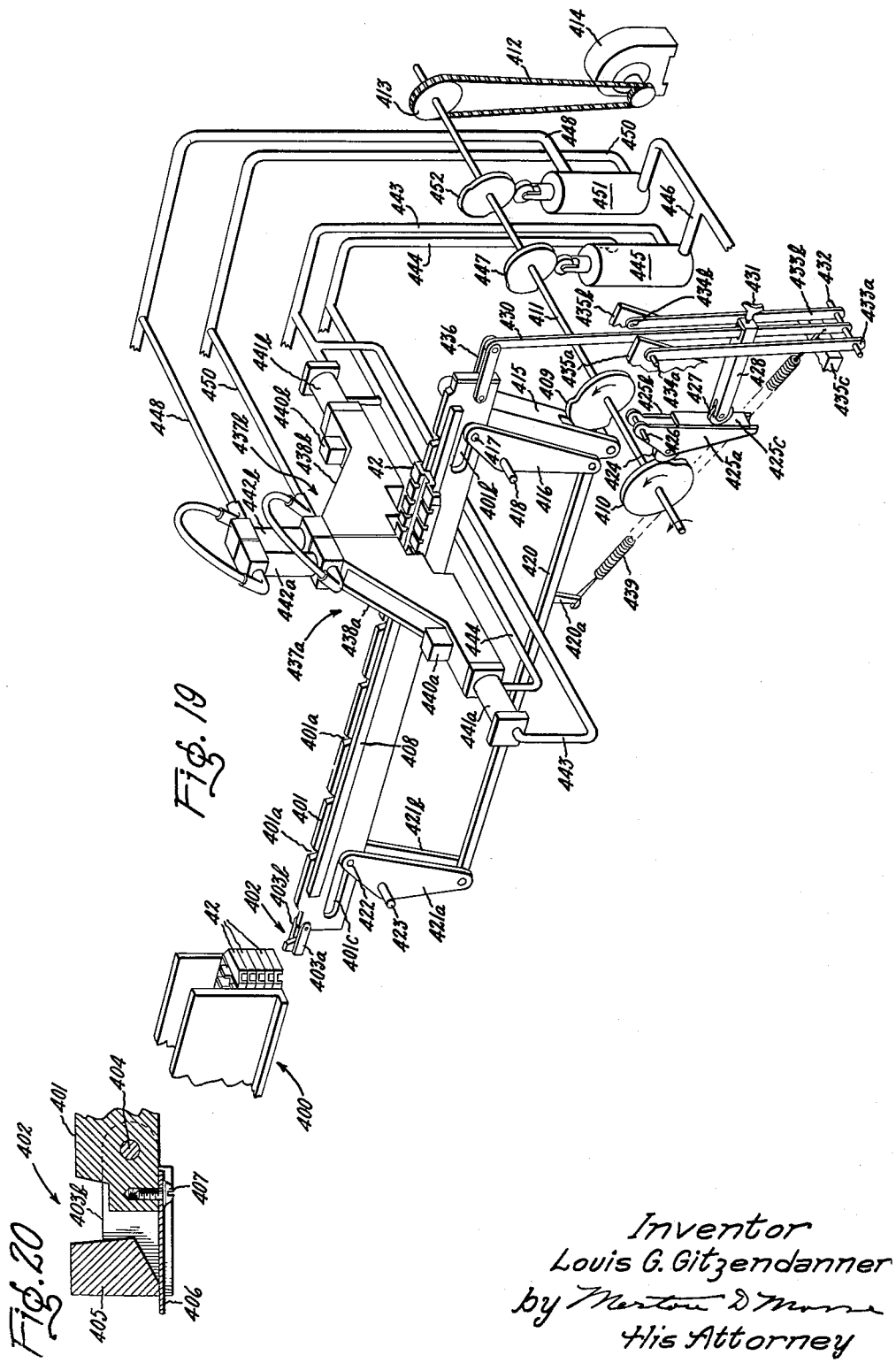

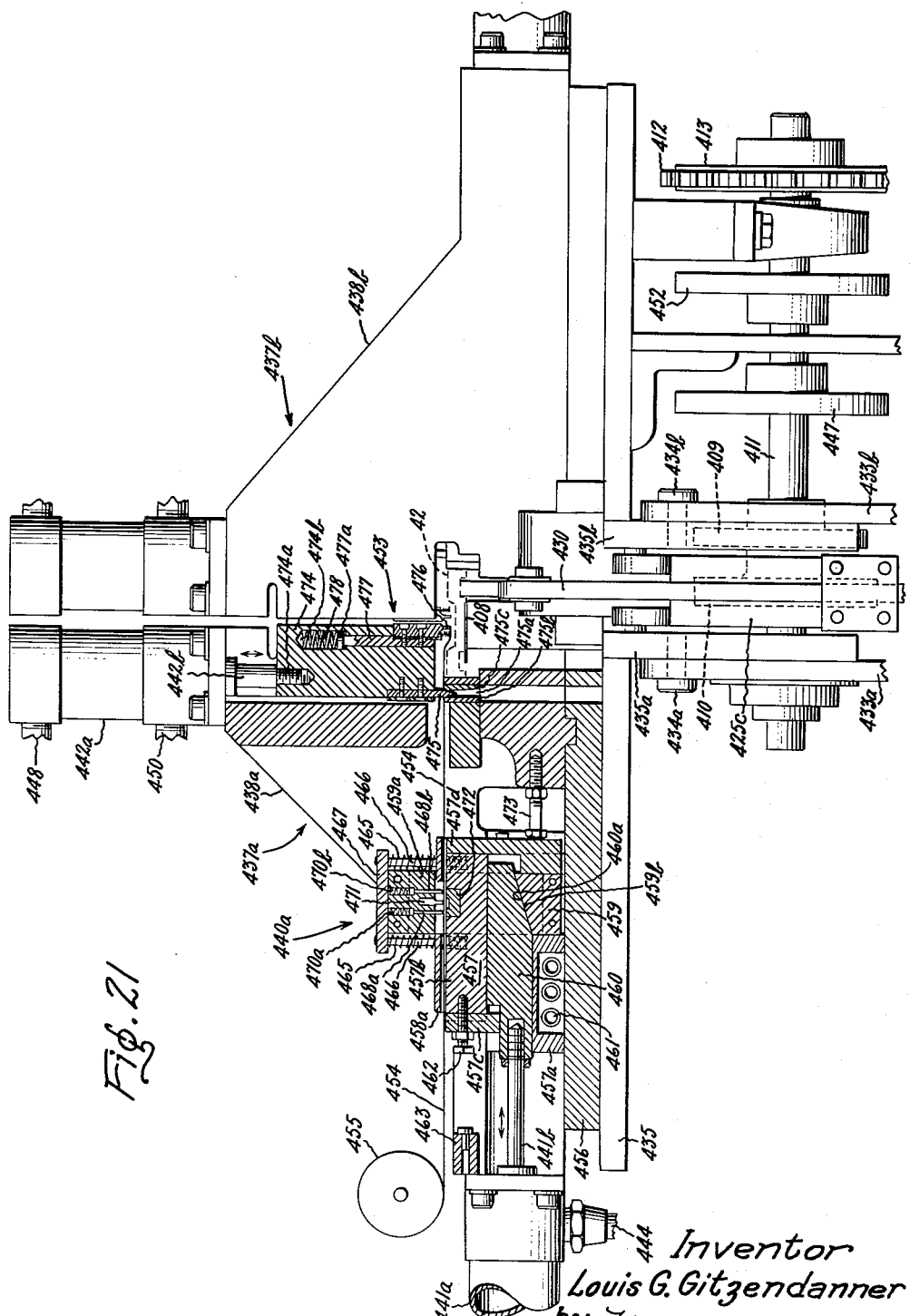

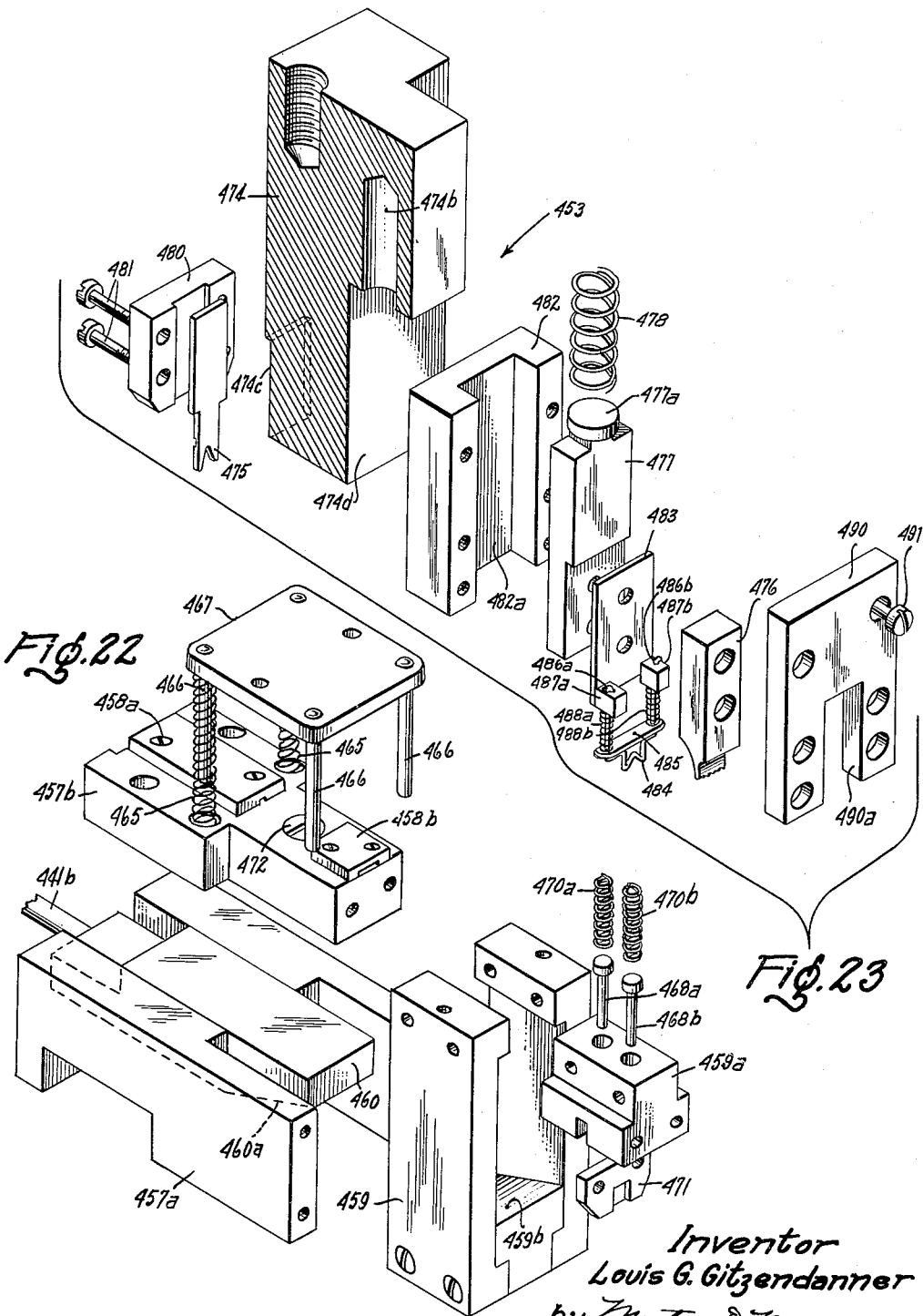

Inventor
Louis G. Gitzendanner
by Merton W. Moore
His Attorney

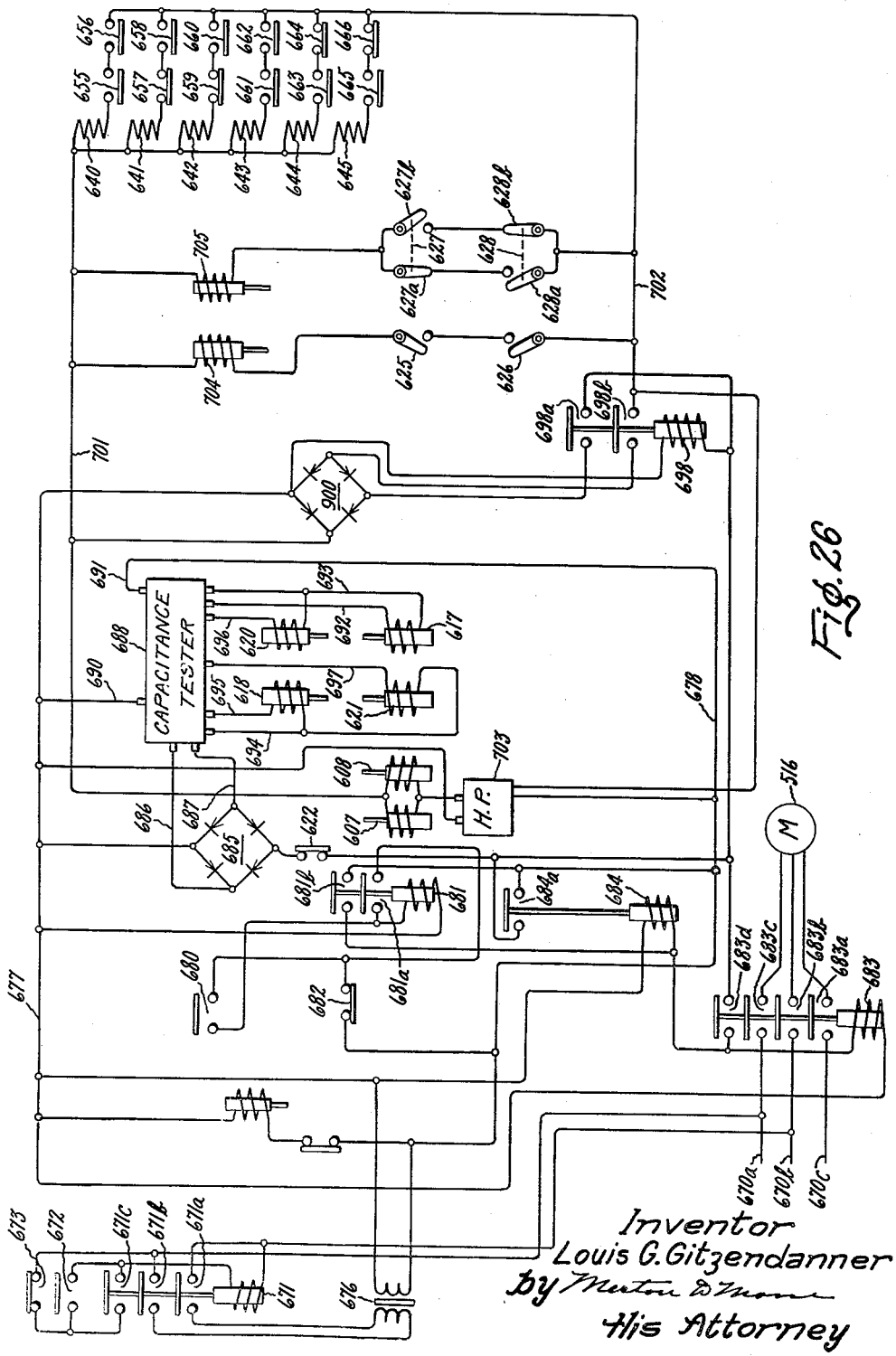

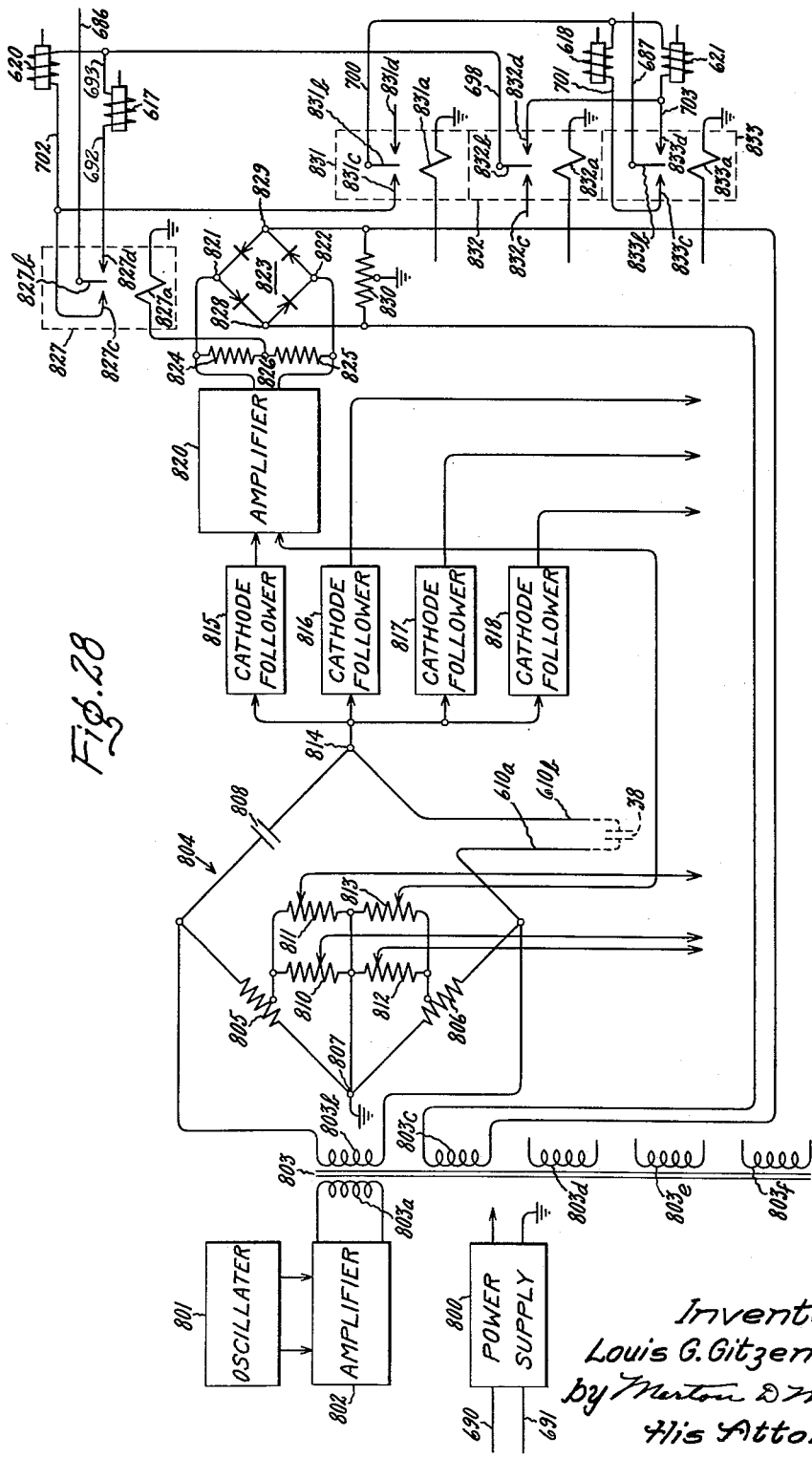

2,997,294
APPARATUS FOR FEEDING, CUTTING AND STACKING MATERIAL FOR CAPACITORS

Louis G. Gitzendanner, Scotia, N.Y., assignor to General Electric Company, a corporation of New York
Filed Sept. 15, 1955, Ser. No. 534,452
14 Claims. (Cl. 270—58)

This invention relates to apparatus for manufacturing electrical capacitors of the fixed capacitance type which utilizes glass as a dielectric.

A known type of electrical capacitor having a fixed capacitance comprises a plurality of conductive plates, usually aluminum, having a thin solid or liquid dielectric sandwiched between the electrodes. In capacitors of high quality, it has been customary to employ mica as a dielectric. However, mica of high quality generally must be imported and is expensive, hence capacitors employing such mica are also expensive.

It is known that capacitors utilizing glass as a dielectric function well and may be of as high quality as mica capacitors. Heretofore, however, such glass capacitors were even more expensive than mica capacitors because they were manufactured essentially completely by hand. Accordingly, a primary object of the present invention is to provide apparatus for manufacturing glass capacitors which virtually eliminates manual operations.

Another object of the invention is to provide such apparatus which is adaptable to manufacture capacitors of various physical and electrical sizes.

A further object is to provide such apparatus for manufacturing capacitors comprising a plurality of alternate layers of dielectric material and conductive plates, wherein the number of alternate layers of dielectric and conductive plates may be predetermined to obtain a desired value of capacitance.

A further object is to provide apparatus for manufacturing glass capacitors which stacks alternately a desired number of layers of metallic conductive plates and glass dielectric, welds leads to opposite ends of the metallic conductive plates, molds the alternately stacked layers of glass dielectric and metallic conductive plates into a single unitary structure, tests, color codes and sorts the finished capacitors into categories or groups depending upon the electrical characteristics of the capacitors.

A further object of the invention is to provide apparatus for manufacturing capacitors which includes testing means for subjecting the finished capacitors to a high potential test and to a capacitance test for determining the values of capacitance of the finished capacitors in terms of tolerance ranges expressed as percentage departure of the capacitance from a given value.

In accordance with the invention, apparatus for manufacturing capacitors comprises four sections which cooperate to provide finished capacitors. The sections consist of stacking means for stacking alternate layers of conductive plates and dielectric strips to provide a stack of partially completed capacitors, welding means for welding electrical leads to alternate layers of the conductive plates of the capacitors in each stack, furnace means for subjecting the stack of dielectric strips and conducting plates to heat and pressure to bond the stack into a unitary structure comprising a plurality of connected capacitors, and testing means for dividing the strip into individual capacitors, testing the capacitors and sorting them into categories or groups according to their electrical characteristics.

The stacking means comprises means for positioning a strip of glass dielectric on a pallet, means for placing a plurality of conductive plates on the strip of glass with the plates spaced apart longitudinally on the strip of glass. Another strip of glass is then placed on top of the plates, and another layer of conductive plates may be placed on top of the second strip of glass in longitudinal alignment with the first layer of conductive plates. Depending upon the value of capacitance desired for the capacitors being manufactured, any given number (within wide limits) of alternate layers of conductive plates and glass dielectric strips may be built up. When the predetermined desired number of layers have been provided, the stack of unfinished capacitors is automatically ejected from the stacking means.

The welding means serves to cut electrical leads of the proper length from a supply roll of wire, to properly prepare the end for welding, and to cold weld those leads to the conductive plates of the capacitors making up the stack ejected from the stacking means. The welding means includes a plurality of welding assemblies for simultaneously welding leads to a plurality of unfinished capacitors in each stack, the welding operation being performed while the stack remains on the pallet on which it was built up.

After the leads have been welded to the individual capacitors comprising the stack, the stack may be removed from the pallet, and heavy glass strips manually placed on the top and bottom of each stack. The stack is placed in a mold and passed through a furnace, which may be of a conventional type available commercially, to mold the stack of glass strips and conductive plates into a unitary strip of capacitors. Preferably, the furnace embodies annealing means to remove any strains that may be formed in the strip during its cooling process.

As it emerges from the furnace, the strip comprises a plurality of glass capacitors joined together. The individual capacitors are separated by suitable means embodied in the testing means to which the strip is passed from the furnace. The testing means also embodies means for discarding capacitors which are physically defective and means for testing the capacitors to determine their electrical characteristics. Each capacitor is subjected to a high potential test consisting of short applications of high voltage. Each capacitor is also tested to determine its value of capacitance in terms of tolerance ranges expressed as percentages of departure of the value of capacitance from a standard value. The capacitors are color coded in accordance with the results of the capacitance test; and, finally, the capacitors are separated into groups according to their electrical characteristics by ejecting them from the testing means down various chutes to receptacles or a conveyor.

The novel features which are believed to be characteristic of the invention are set forth with particularity in the appended claims. The invention itself, however, as to its organization and method of operation, together with further objects and advantages thereof, may best be understood by reference to the following description taken in conjunction with the accompanying drawings, in which FIG. 1 is a block diagram showing the various sections of an apparatus constructed in accordance with the invention;

FIG. 2 is an exploded perspective view illustrating the building up of alternate layers of metallic conductive plates and glass dielectric as performed by the stacking means;

FIG. 3 is a perspective view of the stack of glass plates and metallic conductive plates after electrical leads have been welded to the conductive plates by the welding means;

FIG. 4 is a perspective view of the unitary strip comprising a plurality of capacitors after it has emerged from the furnace means;

FIG. 5 is a perspective view of a finished capacitor;

FIG. 6 is a perspective view of a pallet on which the layers of glass dielectric and conductive plates are stacked by the stacking means and on which the stack remains until it is placed in the furnace means;

FIG. 7 is a perspective skeleton view of the stacking means with some parts omitted and broken away to show its operation more clearly;

FIGS. 8 and 9 are a plan view and a side elevation respective of the means embodied in the stacking means for positioning the strips of glass dielectric on the pallet;

FIG. 10 is a perspective view of the jaws 100 shown in FIG. 7 for gripping the strip of glass dielectric;

FIG. 11 is a vertical sectional view showing the mechanism for actuating the glass gripping jaws 100;

FIG. 12 is a vertical sectional view of a portion of the stacking means showing the means for cutting the metallic conductive plates to the proper size;

FIG. 13 is a vertical sectional view of a portion of the means for transferring the metallic conductive plates from the cutting means 175 shown in FIG. 12 to the pallet 45;

FIG. 14 is a plan view of the means embodied in the stacking means for transferring the metallic conductive plates from the cutting means 175 shown in FIG. 12 to the pallet 45;

FIG. 15 is a vertical sectional view taken on the line 15—15 of FIG. 14;

FIG. 16 is a perspective view of the plunger 370 shown in section in FIG. 15;

FIG. 17 is a vertical sectional view taken on the line 17—17 of FIG. 14;

FIG. 18 is a circuit diagram of the electrical portion of the stacking means;

FIG. 19 is a perspective skeleton view of the welding means particularly showing the control means and the pallet advancing means;

FIG. 20 is a fragmentary sectional view of the pallet engaging finger 402 shown in FIG. 19;

FIG. 21 is a vertical sectional view taken on a plane through the center of the welding assemblies 437a and 437b shown in FIG. 19;

FIG. 22 is a perspective view of a portion of the wire feed mechanism 440 shown in section in FIG. 21;

FIG. 23 is an exploded perspective view of the cutting and welding mechanism 453 shown in section in FIG. 21;

FIG. 26 is a diagram of the electrical circuitry of the testing means;

FIG. 28 is a circuit diagram of the capacitance tester embodied in the circuit of FIG. 26.

Figures 24, 25:
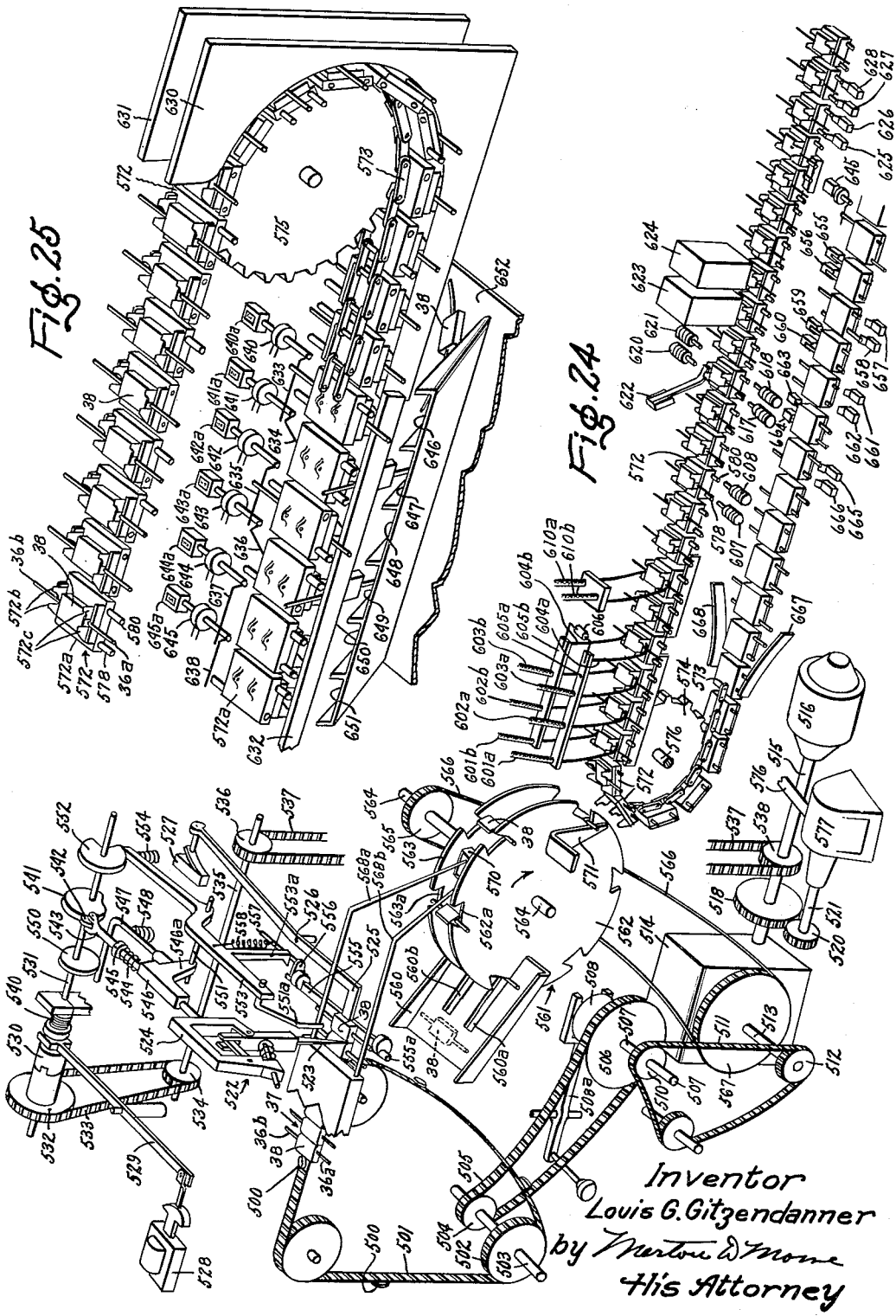
FIG. 24 is a skeletonized perspective view of the testing means.
FIG. 25 is a fragmentary enlarged perspective view of a portion of the testing means showing the means for ejecting the finished capacitors from the testing means.

Because of the complexity of the apparatus of the invention, the subsequent description of one embodiment thereof is arranged in the following outline form:

I. General Description
II. The Pallet
III. The Stacking Means
   A. In General
   B. Glass Positioning Mechanism
   C. Metallic Foil Feeding and Cutting Mechanism
   D. Metallic Conductive Plate Positioning Mechanism
   E. Electrical Circuitry
IV. The Welding Means
   A. The Pallet Feed Mechanism
   B. The Wire Cutting and Welding Mechanism
V. The Furnace Means
VI. The Testing Means
   A. In General
   B. Electrical Circuitry
     1. In General
     2. The High Potential Tester
     3. The Capacitance Tester

I. GENERAL DESCRIPTION

Referring now to the drawings, FIG. 1 shows in block diagram form apparatus constructed in accordance with the invention and comprising stacking means 30, welding means 31, furnace means 32, and testing means 33. The stacking means 30 serves to arrange alternate layers of strips of glass dielectric 34a, 34b, 34c, and 34d and conductive plates 35a, 35b, and 35c in the manner shown in FIG. 2. In the present case, the conductive plates 35 are cut from metal foil, but the invention is not limited to the use of metal plates. The strip of glass 34a is first cut to the proper length and then a plurality of conductive plates 35a are placed upon the glass strip 34a. The plates 35a are spaced apart from each other longitudinally along the length of the strip and extend slightly over one edge of the strip 34a. Next, the strip 34b of glass dielectric is placed on top of the conductive plates 35a, and a second layer of conductive plates 35b are placed on the glass strip 34b. The plates 35b are spaced apart from each other in the same manner as the plates 35a and are longitudinally aligned with the plates 35a along the length of glass strip. However, the plates 35b extend over the edge of the glass strip 34b in the opposite direction from that in which the plates 35a extend over the edge of the glass strip 34a. Another glass strip 34c is then placed on top of the plates 35b. If desired, the stacking means may be adjusted to stop operation at this point and eject the stack of glass dielectric strips and conductive plates therefrom, or it may be adjusted to stack any desired number of layers of glass strips and conductive plates (within a reasonable limit) to provide capacitors of various values of capacitance. The stack shown in FIG. 2 comprises still another layer of conductive plates 35c, which are placed on the glass dielectric strip 34c and extend over the edge of the strip in the same direction as do the plates 35a first placed. A glass strip is then positioned on top of the plates 35c. Of course, if the stacking operation is continued, alternate layers of the conductive plates 35 extend over the edges of the glass strips 34 in opposite directions; that is, the odd layers of metallic plates 35 extend outwardly beyond the edges of the glass strips 34 in one direction, whereas the even layers of metallic plates 35 extend outwardly beyond the edges of the glass strips 34 in the opposite direction.

Throughout the following specification, the numeral 34 is used to refer to any one of the glass strips 34a–34d shown in FIG. 2, and the numeral 35 refers to any one of the conductive plates 35a–35c.

The stacking means 30 may be adjusted to produce capacitors of differing physical sizes. In the example shown in FIG. 2, there are nine metallic conductive plates 35 placed on each of the glass strips; however, if capacitors of a larger physical size are desired, the stacking means may be adapted to provide wider metallic conductive plates. In that case, there would be a smaller number of plates placed on each strip because the length of the glass dielectric strips 34 is fixed. Conversely, if smaller capacitors are desired, the metallic plates may be made narrower and a larger number of them placed on each of the glass strips. In addition, the stacking means is adjustable to vary the length of the metallic conductive plates, as well as the amount by which the plates extend over the edges of the glass strips. The latter adjustment may serve as a vernier to control the value of capacitance of the finished capacitors.

After the desired number of conductive plates 35 and glass dielectric strips 34 have been stacked by the stacking means, the stack of plates and strips is ejected therefrom and is sent to the welding means 31. The welding means 31 serves to weld electrical leads 36a and 36b to the metallic conductive plates extending outwardly beyond the opposite edges of the glass strips 34, as shown in FIG. 3. The leads 36a and 36b are welded to the metallic plates by the process known as "cold welding" which employs pressure to make the weld without the use of heat. The welding pressure is applied through all of the metallic plates that extend beyond the edge of the glass strips on each side of each so that a good electrical connection is provided between the alternately stacked metallic plates. In other words, reverting to FIG. 2, an electrical connection is made between the lead 36a and the metallic plates 35a and 35c comprising each unit of the strip of partially manufactured capacitors, and a similar connection is made between the lead 36b and the metallic plate 35b of the intermediate layer.

After the electrical leads 36a, 36b are welded to the metallic plates by the welding means, the stack of glass dielectric strips and plates is ejected therefrom. At this time, additional strips of glass may be added to the top and bottom of the stack of metallic plates 35 and glass strips 34. The outer glass strips may be thicker and wider than the glass strips 34 previously described and extend outwardly beyond the outer edges of the metallic plates 35. This assemblage may then be placed in a mold for the application of heat and pressure to mold the entire assemblage into a unitary strip. The furnace means 32 (FIG. 1) which serve to mold the assemblage into the unitary strip may be a conventional type that is readily available commercially. Preferably, the furnace means is provided with annealing means in order to relieve any strains that may be set up in the strip during the molding process.

Referring now to FIG. 4, when the assemblage emerges from the furnace means 32, it consists of a solid glass strip, indicated generally by the numeral 37, in which are embedded the metallic plates 35 and the glass dielectric strips 34 previously described. The glass strip 37 comprises a plurality of capacitors 38 which are solidly joined to each other. The electrical leads 36a, 36b, of course, protrude outwardly through opposite edges of the solid glass strip 37.

If desired, the mold in which the assemblage is placed for the molding operation may be constructed to provide indentations 40 on one side of the glass strip 37 to indicate the divisions between individual capacitors 38 where they will eventually be separated from each other.

When the glass strip 37 has emerged from the furnace means 32, it is conducted to the testing means 33. The first function of the testing means is to separate the capacitors 38 comprising the strip 37 to provide individual capacitors, one of which is shown in FIG. 5. Each individual capacitor 38 is then subjected to various electrical tests and conventional coding marks 41 are placed on one surface of the capacitor to indicate its value of capacitance and tolerance range. Finally, each capacitor 38 is ejected from the testing means through one of a plurality of chutes depending upon its electrical characteristics.

The general arrangement and purpose of the apparatus of the invention having been described, each of its components will now be described in detail.

II. THE PALLET

As was previously mentioned, the stack of glass strips 34 and metallic plates 35 (FIG. 2) that comprises a plurality of capacitors is built up on a pallet on which the stack remains until after the electrical leads 36 are welded to the capacitors of the stack. Referring now to FIG. 6, the pallet 42 is provided with a longitudinally extending channel 43 milled or otherwise formed on its upper surface, and a hardened steel strip 44 having a pair of knife edges 45a and 45b formed at its opposite ends is secured in the channel 44. The purpose of the upwardly extending knife edges 45a, 45b will be later described in detail.

The pallet 42 is also provided with a pair of longitudinally extending channels 46a and 46b cut or otherwise formed on its lower surface. A metal strip 47 extends across the lower surface of the pallet from one side to the other and interrupts the channels 46a and 46b.

The upper surface of the pallet 42 is provided with a plurality of transversely extending slots or channels 48 with the number of slots 48 being equal to the number of capacitors comprising the strip that is to be built up on the particular pallet. If the capacitors to be manufactured are physically large, of course, a fewer number of transverse slots 48 are provided, and if the capacitors are to be small, a greater number of slots 48 are provided. In the present instance, the pallet 42 is illustrated as having nine transverse slots 48 therein merely for purposes of illustration to correspond with the number of capacitors previously described with reference to FIGS. 2, 3, and 4. Of course, the purpose of the transverse slots 48 is to receive the electrical leads 36a, 36b (FIG. 3) which are welded to the metallic conductive plates 35 in the welding means 31 previously mentioned.

III. THE STACKING MEANS

A. In General

The construction and operation of the stacking means will first be described in general terms with reference to FIG. 7. It is understood that in the skeletonized perspective view of FIG. 7, the majority of the supporting structure has been omitted in order to show the details of the apparatus more clearly. In addition, it is understood that the relative dimensions and positions of certain parts have been altered somewhat from their true state in order to show them clearly and most conveniently explain their function. Such changes and variations will be easily recognized by one skilled in the art.

The sequence of mechanical operations of the stacking means is controlled by a plurality of cams indicated generally by the numeral 50 mounted on a shaft 51. The shaft 51 is rotated by means of a main drive motor 52 of conventional type with the mechanical connection thereto being made through a chain and sprocket arrangement 53, a conventional gear reduction mechanism 54, a chain 55 which connects a sprocket 56 with the output shaft of the gear reduction assembly 54, and a clutch assembly 57 that connects the sprocket 56 to drive the shaft 51.

The clutch assembly 57 is of the type well known in the art which causes the continuously rotating sprocket 56 to rotate the shaft 51 until a cam surface 57a formed on the outer portion of the clutch assembly 57 is engaged by a dog 58a formed on the end of a lever 58. At that time, the clutch assembly 57 disconnects the sprocket 56 from the shaft 51 and the shaft no longer rotates. The lever 58 is pivoted as at point 60 and may be actuated to release the cam surface 57a by means of a solenoid 61. The operation of the solenoid 61 will be later explained in connection with the description of the electrical circuitry of the stacking means.

The pallet drive means which positions the pallet to have the stack of glass dielectric strips and metallic conductive plates built up thereon, the means for cutting and positioning the strips of dielectric glass, and the means for cutting and positioning the metallic conductive plates will next be described with reference to FIG. 7.

Considering first the pallet drive means, it comprises a sprocket 62 which is rotated by the sprocket 56 through a conventional constant torque slip clutch (not shown). The sprocket 62 is connected to a smaller sprocket 63 by a chain 64, and the sprocket 63 drives a shaft 65 through a clutch 66. The clutch 66 is adapted to be actuated by a solenoid 67 to connect the sprocket 63 to the shaft 65.

The other end of the shaft 65 has mounted thereon a bevel gear 68 which engages and drives another bevel gear 70 formed on or secured to one end of a pulley 71 which drives an endless pallet drive belt 72. The pallet drive belt 72 also passes over another pulley 73 which serves to keep the belt tightly stretched and prevent slippage thereof. The belt 72 is provided with a plurality of upwardly extending studs 74 or the like spaced apart along its length.

Empty pallets of the type described previously with reference to FIG. 6 may be stacked one on top of the other in a hopper or the like (not shown), whereby the lower pallet in the stack may be engaged by one of the studs 74 and caused to travel from left to right (as seen in FIG. 7) with the belt 72.

FIG. 7 shows a pallet 42 in position for the stacking operation to begin. When the belt 72 has moved the pallet 42 to the position shown, it opens a switch (not shown in FIG. 7) which causes a finger 75 to move upwardly to engage the strip 47 that extends across the lower surface of the pallet 42 (FIG. 6). The upward and downward motion of the finger 75 is controlled by a lever 76 on one end of which the finger is mounted. The lever 76 is pivoted as at 77, and its other end is connected by a lever 78 to a solenoid 80 whose operation will be later described. The solenoid 80 acts to keep the finger 75 in an upward position to position the pallet during the entire stacking operation. When the stacking is completed, the solenoid 80 is actuated to drop the finger 75 downwardly and permit the pallet to be ejected from the apparatus.

While the finger 75 is in its upward position during the stacking operation, the solenoid 67 remains energized to connect the sprocket 63 to the belt drive shaft 65 through the clutch 66. However, because the pin 75 is engaging the pallet 42, the shaft 65 cannot rotate and the clutch (not shown) between the sprockets 56 and 62 slips. Thus, the pallet 42 is continuously urged against the finger 75 by the belt 72 and is accurately positioned thereby.

The next portion of the stacking means generally to be considered is that which places the glass dielectric strips 35 (FIG. 3) in position on the pallet 42. Referring now to FIG. 7, a glass ribbon 81, which is cut or broken into strips 34 of the proper length by means to be later described, may be provided from a supply reel 82. The supply reel 82 is driven by a motor 83 which is energized through a switch (not shown) mounted on a pressure arm 84 around which the glass ribbon 81 is fed. The motor 83 serves to rotate the supply reel 82 to feed the glass ribbon in order to minimize the danger of breakage. That is, when the tension on the glass ribbon is increased to a certain point, the switch mounted on the pressure arm 84 is actuated to cause the motor 83 to rotate the reel 82 to supply additional glass from the reel.

The glass ribbon 81 passes between a pair of sponges 85 and 86 or other absorptive materials which are maintained moist by liquid supplied from a reservoir 87. The liquid placed on the glass ribbon 81 by the sponges 85, 86 serves as a temporary adhesive to maintain the metallic plates in the proper positions when they are placed on the glass strip. Excess moisture is removed from the glass ribbon 81 by means of sponges 88 and 90, or other similar absorptive material. The glass ribbon also passes between the arms of a guide 91 which position it transversely.

The sponges 85, 86, 88 and 90, the reservoir 87 and the guide 91 are all mounted on a frame structure 92. The frame structure 92 has a dovetail 92a formed thereon which engages a similarly shaped slide formed on the apparatus base member 93 to permit vertical motion of the frame structure 92 and the parts carried thereby.

The ribbon of glass 81 is pulled from left to right (as seen in FIG. 7) across the pallet by a pair of jaws 94. The jaws 94 are illustrated in FIG. 7 with the glass ribbon 81 having been pulled across the pallet 42 and in position to be broken off to provide a strip 34 of the proper length. However, the operation of the jaws 94 may be best understood by assuming that the ribbon of glass 81 is not in position across the pallet 42 but is broken off just to the right of the guide member 91.

The jaws 94 are supported from a box-like member 95 that contains mechanism for actuating the jaws. The member 95 is carried by a block 96, which is mounted on a pair of transversely extending rods 97 and 98. A gear 100 is retained within a cut-out portion of the block 96 and is splined to the shaft 98. The gear 100 cooperates with a rack 101 formed on the member 95 to provide means for raising or lowering the member 95 and the jaws 94. The rod 98 also has mounted thereon at its other end a gear 102 which cooperates with a rack 103 formed on or attached to the supporting frame 92 at the left side of the apparatus. The rod 98 is caused to rotate by means of a lever 104 secured thereto to move the supporting frame 92 and the member 95 carrying the jaws 94 up and down.

The lever 104 is actuated by a push rod 105 which in turn is moved by a lever 106. The lever 106, which is pivoted as at 107, has one end attached to the push rod 105, and the other end carries a follower wheel 108 that engages a cam 110. The action of the cam 110 and the reason for moving the frame structure 92 and the jaws 94 upwardly and downwardly will be later explained in detail.

The jaws 94 are moved transversely back and forth across the machine by means of a cable 111 secured to the underside of the member 96. The cable 111 extends around a pair of pulleys 112 and 113 and is driven by a pulley 114 mounted on a shaft 115.

The pulley 114 is rotated to cause the member 96 and the jaws 94 carried thereby to move back and forth across the stacking means by means of a gear 116 mounted on the shaft 115. The gear 116 is engaged by a rack 117a formed on an arcuate portion of a lever 117. The lever 117 is pivoted as at 118 and is caused to rotate about the pivot 118 by a cam 120, which engages the end 117b of the lever 117. As the cam 120 actuates the lever 117, the block 96 is moved back and forth transversely across the apparatus.

As mentioned, the member 95 which supports the jaws 94 contains mechanism for opening and closing the jaws. This mechanism will be later explained in detail. The jaws 94 are open and closed at the proper times by a pair of push rods 121, 122, respectively, located at the left and right sides of the apparatus. The push rod 121 is pivotally connected to one end of a bell crank 123, and the bell crank 123 is secured to a transversely extending shaft 124, which provides a pivot axis for the bell crank. The bell crank 123 is rotated by means of a cam 125 which is engaged by a follower wheel 126 mounted at the lower end of the bell crank. The push rod 122 is linked to the transverse shaft 124 by means of a short lever 127, whereby the rods 121 and 122 move up and down in synchronism under the control of the cam 125.

The jaws 94 are so constructed that they remain in either their open or closed positions, and they are in their open position when they are moved from the right to the left of the stacking means. First, the cam 110 causes the transverse rod 98 to be rotated to move upwardly both the frame 92 at the left of the apparatus and the jaws 94 supported from the member 95 at the right of the apparatus. Then the cam 120 causes the shaft 115 to rotate to move the block 96, the member 95 and the jaws 94 to the left of the machine. When the jaws 94 have been moved to the left side of the machine and the end of the glass ribbon 81 extends between the jaws, the frame 92 and the jaws supported from the box member 101 are moved downwardly by the action of the cam 110. When the frame 92 and jaws 94 are in their downward position, cam 125 causes the push rods 121 and 122 to move upwardly. The push rod 121 engages the jaw actuating mechanism carried in the member 95 and causes the jaw 94 to close firmly on the end of the glass ribbon 81. At this time, the cam 110 rotates the rod 98 in the opposite direction and causes the frame 92 and the jaws 94 to move upwardly out of engagement with the end of the push rod 121, which may then be retracted downwardly by the cam 125. The cam 120 then causes the shaft 115 to rotate in a counterclockwise direction, and the block 96, the member 95 and the jaws 94 are moved toward the right of the machine, the jaws 94 carrying the end of the glass ribbon 81 firmly gripped therebetween. When the jaws 94 have reached the right side of the machine, at the position shown in FIG. 7, the cam 110 again rotates the transverse rod 98 to lower the frame structure 92 and the jaws 94 to place the glass ribbon 81 across the top of the pallet 42.

When the glass ribbon 81 is in position across the pallet 42, it is broken off into the strip 34 of the proper length by means of a pair of breaker feet (not shown) formed on the lower portion of a transfer bar 128. The transfer bar 128 is a part of that portion of the apparatus that serves to place the metallic conductive plates 35 on top of the glass strips 34 (FIGS. 2 and 3) and will be further described in connection with that portion of the apparatus.

After the glass strip 34 is in position on the pallet 42 and has been broken off at the ends of the pallet, the push rods 121, 122 are again actuated. The push rod 122 engages the mechanism within the member 95 and causes the jaws 94 to open. The jaws 94 remain in the open position until they have again been moved across the machine to the left to pick up the end of the glass ribbon 81.

After the jaws 94 have opened, the broken end of the glass ribbon 81 remaining between the jaws may be removed by a short blast of compressed air directed thereon. The compressed air may be supplied from a conventional source (not shown) through an on-off type of valve 130 and a supply line 131. The valve 130 may be biased by a spring 132 so that it is normally closed, and it is momentarily opened by means of a lever 133 pivoted as at 134 and actuated by a cam 135 mounted on the end of the main cam shaft 51.

Consider now the mechanism for feeding, cutting to the proper size, and placing the metallic conductive plates 35 that are interposed between the strips 34 of glass dielectric. Referring still to FIG. 7, it is seen that the metallic conductive plates may be provided in the form of a wide strip 136 rolled on a reel or roller 137. The metallic foil strip 136 passes from the reel 137 under a feed roller 138 and over another feed roller 140 mounted on an axle 141. The roller 140 is provided with a plurality of circumferential grooves which cooperate with a plurality of rotating circular knives 142 to cut or slit the foil strip 136 into narrow strips 136a of proper width to form the metallic conductive plates 35.

The knives 142 are circular in shape and are mounted on an axle 143 driven by a motor 144. The axle 143 is geared by conventional gear mechanism 145 to the axle 141 on which the roller 140 is mounted so that the knives 142 and the roller 140 rotate in opposite directions to provide a clean cutting action for the foil 136. Narrow waste strips 136b of foil from between the strips 136a may pass from the roller 140 into a suitable waste receptacle 146.

The action of the circular cutting knives 142 and the roller 140 is such that there is no tendency for them to drive the foil 136 and they cooperate only to cut the foil 136 into strips 136a as it passes over them. The strips 136a of foil are actually advanced by means of a foil feed mechanism shown generally by the numeral 147.

The foil feed mechanism 147 comprises a lower member 148 which extends transversely underneath all of the strips 136a of foil and is reciprocable back and forth from front to rear of the apparatus lengthwise of the strips of foil 136a. A transverse member 150 is located above the strips 136a of foil and has a plurality of teeth 150a extending downwardly between the strips 136a of foil to serve as guides. The upper member 150 also has mounted thereon a strip 151 made of resilient material having good frictional properties, such as rubber or the like. The upper member 150 moves lengthwise of the strips 136a along with the lower member 148 to feed the foil strips 136a toward the front of the apparatus, and is also movable upwardly and downwardly relative to the lower member 148.

The feed mechanism 147 is moved lengthwise of the strips 136a of foil by means of a lever 152, whose upper end is secured to a downwardly projecting arm 148a on the end of the lower member 148 and which pivots about the point 153. The lower end of the lever 152 carries a follower wheel 154, which rides on the edge of a cam 155 mounted on the main cam shaft 51.

The upper member 150 is moved up and down with respect to the lower member 148 by means of a pair of push rods 156 and 157 mounted at the outer ends of the upper member 150 and projecting downwardly through the ends of the lower member 148. The lower end of the push rod 156 is provided with a suitable cam follower 158 which engages a cam surface 160a formed on a lever 160. One end of the lever 160 is fixed to a shaft 161 and pivots about the axis of the shaft. The other end of the lever 160 carries a follower wheel 162 which engages the surface of a cam 163. Mounted on the end of the shaft 161 remote from the lever 160 is a small cam 164. The cam 164 is engaged by a follower wheel 165 mounted on the lower end of the push rod 157 previously mentioned.

As the cam 163 rotates, the lever 160 causes shaft 161 to rotate. The cam surface 160a formed on the lever 160 and the cam 164 cause the push rods 156 and 157 to move the upper member 150 upwardly and downwardly relative to the lower member 148.

In operation, as the upper member 150 moves downwardly toward the lower member 148, the resilient pad 151 contacts the strips 136a of foil and exerts pressure on the strips to force them against the upper surface of the lower member 148. The pad 151 also has a portion (not shown in FIG. 7) that serves to straighten out the strips and take out any slack that may have occurred in one or more of them. That feature will be later explained in more detail.

After the upper member 150 has moved downwardly toward the lower member 148, and the strips 136a of foil are secured between the pad 151 and the lower member 148, the entire feed mechanism 147 is moved toward the front of the apparatus through the action of the cam 155 which rotates the lever 152 about point 153. Of course, the feed mechanism 147 rotates about an axis through the point 153. The reciprocatory motion of the feed mechanism 147 is just sufficient to advance the strips 136a of foil by an amount equal to their desired length when they are eventually used as the metallic conductive plates of a capacitor.

As the strips 136a of foil are advanced by the feed mechanism 147, they are moved into position to be cut into short lengths for eventual placement in position on the glass dielectric strips. The cutting of the strips 136a of foil to the proper length is done by a cutting mechanism, indicated generally by the numeral 166. The cutting mechanism 166 comprises a pair of transverse bars 167 and 168 having flat upper surfaces over which the strips 136a of foil are slid. The members 167 and 168 have a slot 170 formed therebetween which, in cooperation with a guillotine type cutter comprising a blade support 171 and a depending blade 172, function to cut the strips 136a of foil to the proper length.

The blade 172 is reciprocated upwardly and downwardly by means of a pair of push rods 173 and 174 secured to the ends of the blade support 171. The lower ends of the push rods 173 and 174 are provided with suitable cam followers 175 and 176, respectively, which ride in grooves 177a and 178a cut in cams 177 and 178, respectively. Of course, the timing of the motion of the blade 172 is such that it is in its upward position while the strips 136a of foil are being advanced thereunder by the action of the feed mechanism 147.

A movable member (not shown in FIG. 7) is provided in the slot 170 between the bars 167 and 168 to insure that the foil does not "stub" as it is slid across the slot 170. That member moves upwardly and downwardly to guide the foil across the slot, and is actuated by a pair of push rods 180 and 181 located near the outer ends of the members 167 and 168. The push rods 180, 181 are moved by means of yokes 182, 183, respectively, which are mounted on a shaft 184. The shaft 184 is rotated by means of a lever 185, which has one end secured thereto. The lower end of the lever 185 rides upon the edge of a cam 186.

As the cam 186 rotates with the cam shaft 51, it causes the lever 185 to rotate the shaft 184, thus raising and lowering the outer edges of the yokes 182 and 183. This action in turn raises and lowers the movable member (not shown) through the action of the push rods 180 and 181. Of course, the timing is such that the movable member is raised to guide the strips 136a of foil across the slot 170 as they are advanced by the feed mechanism 147, and is lowered to open the slot 170 during the cutting operation.

After the strips 136a of metallic foil have been cut to the proper length by the cutting mechanism 166 to provide the conductive plates 35 shown in FIGS. 2 and 3, the plates are picked up from the upper surface of the bar 168 and transferred to the glass dielectric strip 34, which has previously been placed in position on the pallet. The plates 35 are picked up and transferred by the transfer bar 128, previously mentioned, carried by a frame structure comprising side members 187 and 188 and a cross bar 190. The side members 187, 188 are pivotally secured at their outer ends, at 191, to a plate 192. The plate 192 is mounted on a pair of rods 193 and 194 for reciprocal movement toward the front and rear of the machine.

Movement of the plate 192, and, hence, the transfer bar 128 toward the front and rear of the apparatus is controlled by a lever 195, the lower end of which is pivoted as at 196. A rod 197, having a suitable cam follower wheel 198 one end to engage the edge of a cam 200, has its other end rotatably connected to the lever 195 at a point above the pivot point 196. Thus, as the cam 200 rotates, the rod 197 moves back and forth longitudinally through its support 201, and rotates the lever 195 about its pivot 196 to reciprocate the plate 192 and transfer bar 128 back and forth.

The upward and downward movement of the transfer bar 128 is necessary to pick up the metallic plates 35 from the upper surface of the bar 168 and, after the transfer bar has moved toward the front of the apparatus, to place them on the glass strip on the pallet 42. This movement is controlled by a pair of cams 202 and 203 that engage the lower surface of the cross bar 190 that connects the frameside members 187 and 188. The cams 202, 203 are mounted on a shaft 204 that is rotatable by means of a rod 205 which connects the rear portion of the cam 202 with a lever 206. One end of the lever 206 is connected to the rod 205, while the other end is provided with a suitable follwer wheel 207 to engage a cam 208. The lever 206 is pivoted as at 210. Thus, movement of the lever 206 about its pivot 210 causes the shaft 204 to rotate and the cams 202 and 203 to raise or lower the frame cross bar 190 and the transfer bar 128.

In operation, starting from the position shown in FIG. 7, the cam 208 first causes the frame structure carrying the transfer bar 128 to rotate upwardly about its pivot points 191 on the plate 192. Then the cam 200 causes the plate 192 carrying the frame and transfer bar 128 to move toward the rear of the apparatus. When the transfer bar 128 is above the metallic plates 35 lying on top of the transverse bar 168, the cam 208 causes the transfer bar 128 to be lowered to rest on top of the metallic plates 35. The plates 35 are then picked up from the bar 168 by means to be described hereafter. As the cam 208 rotates still farther and raises the transfer bar 128, the cam 200 causes the transfer bar 128 to be moved toward the front of the apparatus, after which the cam 208 again lowers the transfer bar 128 to place the metallic plates 35 on top of the glass strip 34 lying on the pallet 42. The metallic plates 35 are released by the transfer bar 128 and retained in position on top of the glass dielectric strip 34 by the liquid previously placed on the strip 34 when it was fed into the apparatus, as previously discussed. Then the transfer bar 128 is raised from the pallet 42 by the cam 208 and again moved toward the rear of the apparatus by the cam 200 to pick up another set of metallic plates 35 which have in the meantime been advanced by the mechanism 147 and cut by the mechanism 166. While the transfer bar 128 is raised and is moving toward the rear of the apparatus to pick up the next set of plates 35, another strip of dielectric glass 34 is laid in place on top of the metallic plates 35 deposited on the pallet 42 and the operation is repeated.

As was previously mentioned, the small metallic conductive plates 35 are picked up from the upper surface of the bar 168 by the transfer bar 128. This is done by means of a vacuum. The lower surface of the transfer bar 128 is provided with a plurality of apertures (not shown in FIG. 7) which communicate internally with a supply line 211. The supply line 211 is connected to a three-way valve 212 having a pair of inlet lines 213 and 214. The inlet line 213 may be connected to a source (not shown) of pressurized air of relatively low pressure and the line 214 may be connected to a vacuum pump or the like (not shown). The valve 212 is a conventional type readily available commercially, in which the connection between the inlet lines 213, 214 and the supply line 211 is controlled by a lever 215. The lever 215 is actuated through a rod 216 which is connected to one end of a lever 217. The lever 217 is pivoted at its other end, as at 218, and is actuated by a cam 220.

The cam 220 is so shaped that when the transfer bar 128 is in position to pick up the metallic plates 35 from the upper surface of the bar 168, the vacuum line 214 is connected to the supply line 211 so that the vacuum holds the metallic plates 35 against the lower surface of the transfer bar 128. The vacuum line 214 continues to be connected to the supply line 211 until the transfer bar 128 has placed the plates 35 on top of the strip 34 of glass dielectric on the pallet 42. At that time, the cam 220 causes the vacuum line 214 to be disconnected from supply line 211 and pressure line 213 to be connected thereto. Thus, the metallic plates 35 are positively released from the lower surface of the transfer bar 128 and remain in position on top of the strip 34 of glass dielectric on the pallet 42.

It was stated in connection with FIG. 2 that alternate layers of metallic conductive plates 35 protrude a slight amount on opposite sides of the glass strip 34 on which they are laid. This arrangement, of course, is controlled by the position of the transfer bar 128 at the time the metallic plates 35 are released from its lower surface and placed on top of the strip 34 of glass dielectric on the pallet 42. That position in turn is controlled by the extent of the movement toward the front of the apparatus of the plate 192 that carries the transfer bar. The movement of the plate 192 toward the front of the machine (away from the foil cutting means 166) is limited by a plurality of mechanical stops, one of which, designated by the numeral 221, is shown in FIG. 7. The stop 221 is adapted to move upwardly and downwardly relative to the base plate 93 of the apparatus, whereby it engages the rear surface of the plate 192 on alternate reciprocal cycles of the plate. The stop 221 is moved upwardly and downwardly by a rod 222, whose lower end is connected to one arm of a crank 223. The crank 223 is pivoted as at 224 and its other arm carries a follower wheel 225 that engages a cam 226. Thus, as the cam 226 rotates, the rod 222 carrying the stop 221 moves upwardly and downwardly.

The cam 226 is mounted on an axis 227 which also has mounted thereon a sprocket 228. The sprocket 228 is rotated by means of a chain 230 which is driven by a sprocket 231 mounted on the main cam shaft 51. As the shaft 227 and cam 226 rotate and rotate the crank 223 about its pivot 224, the rod 222 carrying the stop 221 moves upwardly and downwardly. The ratio between the sprockets 228 and 231 and the shape of the cam 226 are such that the stop 221 is in its upward position during alternate movements of the plate 192 theretowards. FIG. 7 also shows a counter 232 which operates to stop the apparatus when a desired number of alternate layers of metallic conductive plates 35 and glass dielectric strips 34 have been built up on the pallet 42. The operation of the counter 232 will be explained in greater detail in connection with the electrical circuit of the stacking means to be hereafter described. The counter 232 is of conventional type which acts to close a switch after the counter has been mechanically actuated a predetermined number of times. The counter may then be electrically reset to repeat the counting operation. Of course, the predetermined number of counts may be varied by an operator. A suitable counter of this type is known as the Microflex Reset Counter manufactured by the Eagle Signal Corporation, Moline, Illinois.

The counter 232 is mechanically actuated by means of a rod 233 which is connected to a lever 234 pivoted intermediate its ends, as at 235. The end of the lever 234 carries a follower wheel 236 which engages a cam 237 mounted on the cam shaft 51. The cam 237 is so formed that the counter 232 is actuated once for each layer of metallic conductive plates 35 built up on the pallet 42.

When the desired number of alternate layers of glass dielectric strips 34 and conductive plates 35 have been stacked, the counter 232 closes a switch which energizes the solenoid 80 to lower the finger 75 that has been restraining the pallet 42 against movement. The rod 78 that moves upwardly when the solenoid 80 is energized and lowers the finger 75 also lowers a glass exhaust box 238 which is positioned to receive scrap glass from between the jaws 94. The exhaust box 238 is secured to a yoke 240 mounted for rotation on pins 241. The rod 78 is connected to the yoke 240 so that upward movement of the rod 78 rotates the yoke 240 on the pins 241 and lowers the glass exhaust box 238. When the finger 75 and the box 238 are removed from the path of the pallet 42, the pallet is free to move. Hence, the pallet feed belt 72 moves to eject the pallet from the stacking means.

When changing over the apparatus to manufacture capacitors of a different physical size, it is necessary to change the arrangement of the circular cutting knives 142 and the grooved roller 140, the upper member 150 in the foil feed mechanism 147 and the transfer bar 128. Other adjustments must be made, of course, but these are believed to be obvious to one skilled in the art.

The various portions of the stacking means which are not clearly shown in FIG. 7 will now be described with reference to more detailed figures.

B. *Glass positioning mechanism*

The construction of the glass positioning mechanism that pulls the glass ribbon 81 across the pallet 42 will be described with reference to FIGS. 8 and 9. As was previously mentioned, the jaws 94 are supported from a box-like member 95 which is carried on a block 96. The cover 95a of the member 95 extends beyond the sides of the member 95 and is held against the block 96 by a retaining plate 96a. The block 96 is mounted on the pair of rods 97 and 98 which are mounted at their ends in supporting brackets 242 and 243.

The rod 97 may be fixedly mounted, and the rod 98 is rotatably mounted in suitable bearings in the brackets 242 and 243. As previously mentioned, the rod 98 is rotated by a lever 104 which in turn is rotated about the axis of the rod 98 by a rod 105.

The jaws 94 are moved back and forth across the apparatus by means of the cable 111 supported around the pulleys 112 and 113. The cable 111 is caused to move by the pulley 114, whose operation has been previously described. The block 96 which carries the jaws 94 is secured to the cable 111 by a bolt and nut combination 244 as best seen in FIG. 9. The pulley 113 is mounted between a pair of arms 245 and 246 which are carried by an upright member 247. The upright member 247 has a stud 248 fixed therein which extends through a post 250 secured to the bed-plate 93 of the apparatus. By tightening down a nut 251 threaded onto the end of the stud 248, the position of the pulley 113 may be varied to take up any slack in the cable 111. The pulley 112 may be mounted in a suitable bracket 252 secured to the bed-plate 93 of the apparatus.

The pallet 42 is supported on a plate 253 secured to the top surface of a box-like structure having side walls 254a and 254b and a top wall 255. Guides 256a and 256b are secured to the plate 253 to guide the pallet 42 and a pair of plates 257a and 257b are secured to the top surfaces of the guides 256a and 256b as by screws 258 to prevent any upward and downward motion of the pallet 42. The pallet supporting structure may also be seen in section in FIG. 12.

Referring still to FIGS. 8 and 9, after the pallet 42 has been brought into position and stopped by engagement of the finger 75 with the strip 47 that extends across the bottom of the pallet, it is ready to have a strip 34 of glass dielectric placed thereon. At that time, the cable 111 is caused to move the jaws 94 from the position shown in broken lines at the right side of FIG. 8 to the position shown in full lines at the left side of that figure. As previously mentioned, the glass ribbon 81 is threaded between a pair of sponges 85 and 86 in order to moisten the surfaces of the glass ribbon. It then passes between a pair of absorbent pads 88 and 90 (FIG. 7) to remove excess moisture. The pad 90 is fixedly mounted, but the pad 88 is mounted on a lever 259 which extends through the frame 92 and is pivoted as at 259a. A spring 260 urges the outer end of the lever 259 upwardly to maintain a slight pressure between the absorbent pads 88 and 90 and the glass ribbon 81. After passing between the absorbent pads 88 and 90, the glass ribbon 81 passes through the guide 91. A support 261 is located beneath the glass ribbon 81 in alignment with the glass guide 91 to prevent the glass ribbon from sagging and possibly fracturing.

Before the jaws 94 start their movement from right to left across the machine (as seen in FIG. 8) to pick up the end of the glass ribbon 81, both the supporting frame structure 92 at the left side of the machine and the jaws 94 at the right side of the apparatus are moved upwardly. This action occurs as the rod 98 is rotated by movement of the lever 104, and the gears 100 and 102 engage the racks 101 and 103, respectively, to move upwardly the structures on which the racks are mounted. Then, after the jaws 94 have been moved upwardly, movement of the cable 111 causes the jaw supporting assemblage to move from right to left, as seen in FIGS. 8 and 9.

As was previously mentioned, the opening and closing of the jaws 94 is controlled by movement of a pair of push rods 121 and 122, the rod 121 functioning to close the jaws 94 to pick up the end of the glass ribbon 81 and the rod 122 functioning to open the jaws when the glass ribbon 81 has been pulled across the pallet and broken off at the correct length. The construction and operation of the jaws 94 will now be explained with reference to FIGS. 10 and 11. Looking now at FIG. 10, it is seen that the jaws 94 comprise an upper member 94a and a lower member 94b. The upper jaw member 94a is secured to a shaft 262 and the lower jaw member 94b is secured to a hollow shaft 263 concentric about the shaft 262. Both the shafts 262 and 263 are located within a cylindrical supporting shaft 264 which is secured to the box-like structure 95. It is seen that in order to open the jaws 94a and 94b it is necessary only to rotate shafts 262 and 263 relative to each other.

The box-like structure 95 from which the jaws are supported and which contains their operating mechanism is shown in detail in FIG. 11. The supporting cylindrical shaft is fixed to the box-like member 95 and the shafts 262 and 263 extend into the member 95. The shaft 262 has a lever 265 secured to its end inside the box-like member 95 and the shaft has a similar lever 266 secured to its inner end. The outer ends of the levers 265 and 266 have curved levers 267 and 268, respectively, pivotally secured between the arms of the yoke-like member 270. When the member 270 moves upwardly or downwardly the levers 267 and 268 move in the same direction causing the levers 265 and 266 to rotate in opposite directions and thus open and close the jaws 94a and 94b fixed to the shafts 262 and 263, respectively.

The yoke-like member 270 is actuated by another member 271 which is resiliently connected thereto. The member 271 is provided with a bore 271a through which extends a screw 272 that is threaded into the member 270. The screw 272 is slideable within the bore 271a and its head engages a shoulder 271b formed in the bore 271a. When the head of the screw 272 is engaging the shoulder 271b the members 270 and 271 are separated by a small amount. A captive spring 273 surrounds a portion of the screw 272 and is seated within bores 270a and 271c in the members 270 and 271, respectively. The spring 273 serves to urge the members 270 and 271 apart until the head of the screw 272 engages the shoulder 271b in the member 271.

One end of lever 274 is rotatably mounted between the arms at the lower end of the member 271 and the lower end of the lever 274 is rotatably connected to a lever 275, which is pivotal about a pin 276. As the lever 275 pivots about the pin 276, it moves the lever 274 upwardly and downwardly and, acting through the members 270 and 271 and levers 265, 266, 267, and 268, opens and closes the jaws 94. Movement of the lever 275 is controlled by the push rods 121 and 122 previously described.

In operation, when the jaws 94 have moved to the left side of the stacking means to pick up the end of the glass ribbon 81, as seen in FIG. 8, a button 121a formed on the top of the push rod 121 engages a protuberance 275a formed on the lever 275 to rotate the lever 275 about the pin 276 to the position shown in FIG. 11. The push rod 121 rotates the lever 275 in a clockwise direction until it engages a stop 277 secured to the box-like member 95. At this time, the members 270 and 271 have been moved upwardly to cause the lever 265 to rotate in a counterclockwise direction and the lever 266 to rotate in a clockwise direction, thus closing the jaw members 94a and 94b. In this condition, the spring 273 between the members 270 and 271 is compressed somewhat and a continuous upward pressure is exerted on the member 270 by the spring 273 which, through the action of the various levers, keeps the jaw members 94a, 94b firmly pressed together. Of course, at this time, the end of the glass ribbon 81 is interposed between and firmly gripped by the jaw members 94a and 94b. Reverting again to FIG. 8, the jaws 94 are then raised by rotation of the rod 98 and movement of the cable 111 transverses the jaws 94 holding the glass strip from the left side of the stacking means back to the right side thereof. At that time, movement of the cable 111 is stopped.

When the cable 111 has stopped, the rod 98 is again rotated to cause the jaws 94, which are now located at the right of FIG. 8 in the position shown in broken lines, to be lowered until the glass ribbon 81 rests on the pallet 42. At that time, the glass ribbon 81 is broken off at the ends of the pallet 42 by means to be described later in detail. Thus, the jaws 94 are still closed and are retaining a small fragment of glass therebetween.

The push rod 122 is then actuated to cause the button 122a formed upon the upper end of the push rod to engage a protuberance 275b formed on the lever 275 shown in FIG. 11. This causes the lever 275 to rotate in a counterclockwise direction about the pin 276 until it is stopped by contact with a stop member 278 secured to the box-like structure 95. Rotation of the lever 275 in a counterclockwise direction causes the members 270 and 271 to move downwardly and, through the levers 267 and 268, causes the lever 265 to rotate in a clockwise direction and the lever 266 to rotate in a counterclockwise direction. Thus, the jaw 94a moves upwardly and the jaw 94b moves downwardly to release the fragment of glass held therebetween.

Referring again to FIGS. 8 and 9, the glass exhaust box 238 for receiving the fragment of glass that drops from between the jaws 94 is shown in more detail than in FIG. 7. The box 238 is formed with a notch 238a in one wall into which the supporting cylinder 264 for the jaws 94 fits. When the jaws 94 are within the exhaust box 238 and have opened to drop the fragment of glass from between the jaws, they may be subjected to a short blast of air to make sure that the broken fragment drops out of the jaws. The air is supplied through a line 131, which was previously described with reference to FIG. 7. The line 131 is connected with vent means 280 to direct the air against the jaws 94. The glass exhaust box 238 may be connected by means of a chute 281 or other convenient means to a suitable receptacle to receive the broken fragments of glass.

The glass exhaust box 238 is pivotally mounted on pins 241, only one of which is shown in FIGS. 8 and 9. The pins are supported in brackets 282 secured to the bedplate 93 of the apparatus. As previously mentioned, when a pallet has a complete stack of glass dielectric strips 34 and metallic conductive plates 35 built up thereon, it is ejected from the stacking means. In order to eject the pallet, it is necessary that the receptacle 238 be lowered from the path of the pallet 42. This is accomplished, as previously described, by means of the rod 78 which is actuated by the solenoid 80 to push upwardly on the yoke 240. Thus, the yoke 240 that supports the exhaust box 238 pivots on the pins 241 and drops downwardly out of the way of the pallet 42 being ejected.

C. *Metallic foil feeding and cutting mechanism*

FIG. 12 illustrates the metallic foil feed mechanism 147 and the foil cutting mechanism 166 in detail. The foil feed mechanism 147 comprises an upper member 150 and a lower member 148 which cooperate to advance the strips 136a of foil which extend therebetween. As previously mentioned with reference to FIG. 7, the upper member 150 is mounted on rods 156 and 157 at opposite ends of the member, with only the rod 156 being shown in FIG. 12. It is understood that the construction and action of the rod 157 at the other end of the upper member 150 is similar to that of the rod 156. The rod 156 extends downwardly through end pieces 148b and 148a of the lower member 148 and its upward and downward movement is controlled by the cam surface 160a on the lever 160, which lever is controlled by the cam 163. A spring 283 surrounds a portion of the rod 156 and is in terposed between a collar 284 fixed to the rod 156 and the lower surface of the end piece 148b of lower member 148 through which the rod 156 extends. The action of the spring 283 is to urge the rod 156 downwardly to maintain the cam follower 158 on its lower end in contact with the lever 160 and to maintain the cam follower 162 of the lever 160 in contact with cam 163. As previously pointed out, lever 160 rotates the shaft 161 which actuates the rod 157 at the other end of the upper member 150. The shaft 161 is mounted for rotation in a bracket 93a that depends from the base plate 93 of the apparatus.

The entire feed mechanism 147 is reciprocal toward the front and back of the apparatus (left and right as seen in FIG. 12). This action is controlled by the cam 155 and the lever 152 which is secured to the downwardly projecting arm 148a of the lower member and is pivoted as at 153. A spring 285 is interposed between the lever 152 and the bracket 93a to urge the cam follower 154 on the lever 152 into engagement with the cam 155.

The amount of reciprocal motion of the foil feed mechanism 147 is controlled by the position of a stop 286 which is adjustable from left to right, as seen in FIG. 12. The stop 286, whose construction and adjustment will be later described in detail, is provided with a button 286a which engages a similar button 148d formed on the lower member 148. Because the foil feed mechanism 147 is driven toward the rear of the apparatus by the spring 285 acting on the lever 152, the cam follower 154 may become disengaged from the cam 155 and the rearward motion of foil feed mechanism 147 stopped whenever the button 148d on the lower member 148 contacts the stop button 268a.

The rubber strip 151 carried by the upper member 150 is provided with a downwardly extending lip 151a at its forward edge similar to a squeegee.

In operation, assuming that the feed mechanism 147 is in the position shown in solid lines in FIG. 12, the upper member 150 is caused to move downwardly by the cam 163. This occurs because the cam 163 rotates the lever 160 in a counterclockwise direction, thus permitting the rod 156 to move downwardly under the urging of spring 283. The squeegee or lip 151a of the rubber strip 151 first tengages the strips 136a of foil and tends to push them toward the left as seen in the figure. This straightens out any differences in slack that may have occurred between the various strips. Then as the upper member 150 continues to move downwardly, the main portion of the rubber strip 151 contacts the strips 136a of foil and presses them against the upper surface of the lower member 148. Then, while the foil strips 136a are held in this manner, the cam 155 causes the lever 152 to rotate in a counterclockwise direction to move the feed mechanism 147 from the right toward the left to the position shown in broken lines in FIG. 12. Thus, the strips 136a of foil are advanced under the cutter bar mechanism 166 which will next be described. After the foil strips 136a have been advanced and cut as will be described, the upper member 150 moves upwardly to release the strips and the feed mechanism 147 moves toward the rear of the machine to repeat the foil feeding operation.

The foil cutting mechanism 166 was previously described in connection with FIG. 7 as being of the guillotine type comprising an upper member 171 having a depending blade 172 secured thereto. The upper member 171 is moved upwardly and downwardly through the action of push rods 173 and 174, which are actuated by cams 175 and 176. Referring now to FIG. 12, it is seen that the blade 172 is secured to the member 171. The stud 287 extends through an opening in the blade 172 and the blade 172 is held in position against the upper member 171 by a spring 288 surrounding the stud 287, between the blade 172 and a nut 290 threaded on the outer end of the stud. A lock nut 291 may also be threaded on the stud 287, if desired. As the upper member 170 and the blade 172 move downwardly, the lower edge of the blade fits into the slot 170 provided between the lower members 167 and 168 previously mentioned.

As the strips 136a of metal foil are advanced to the left as seen in FIG. 12 by the foil feed mechanism 147, it is possible that the leading edges of the foil strips might catch on the rear edge of the member 168 and buckle the foil. Therefore, a long strip-like member 292 extending the length of the blade 172 and having a beveled upper edge 292a is provided between the members 167 and 168. Beveled edge 292a of the member 292 extends somewhat above the upper surfaces of the members 167 and 168. Thus, as the strips of metal foil 136a are advanced, they ride over the beveled edge 292a and across the slot 170 without buckling.

The strip 292 is reciprocable upwardly and downwardly so that when the upper member 171 and the blade 172 move downwardly, the strip 292 may also move downwardly to open the slot 170. The strip 292 is mounted on rods 180 and 181 previously mentioned in connection with FIG. 7 with only the rod 181 being shown in FIG. 12. The rod 181 has an enlarged head 181a on its lower end, which is engaged by the yoke 183 also previously mentioned. The yoke 183 is mounted on the shaft 184 that is rotated by means of the lever 185. A spring 293 surrounds the rod 181 and bears against the bed-plate 93 of the apparatus and against the lower surface of the strip 292 to urge the strip 292 into its upward position.

When the strips 136a of foil are advanced by the foil feed mechanism 147, the cutting mechanism 166 is in its upper position so that the strips 136a of foil can pass under the blade 172 and extend across the upper surfaces of the members 167 and 168. At that time, the member 292 is also in its upper position to guide the strips 136a of foil across the slot 170. Then, when the foil feed mechanism is in the position shown in broken lines in FIG. 12, the member 292 moves downwardly to open the slot 170 and the blade 172 moves downwardly to cut the strips 136a of foil into plates 35. Of course, the cutting mechanism 166 and member 292 then move upwardly again to permit the strips 136a to feed again.

D. *Metallic conductive plate positioning mechanism*

As previously mentioned, the transfer bar 128 which is part of the conductive plate positioning mechanism moves to the left and right as shown in FIG. 12 to pick up the small conductive plates 35 from the upper surface of the member 168 and to place them in proper position on the strip 34 of glass laid on the pallet 42. The position of the transfer bar 128 at the time when it picks up the metallic plates 35 from the upper surface of the member 168 is shown in broken lines in FIG. 12, and its position when it places the metallic plates 35 on the glass strip 34 shown in solid lines.

The metallic conductive plates 35 are picked up on the under surface of the transfer bar 128 by means of suction and, when the transfer bar 128 is in position to place the small plates on the pallet, the plates are released from the transfer bar 128 by removing the suction and subjecting them to air under a relatively low pressure. Both the suction and pressure are supplied to the transfer bar 128 through the supply line 211 which is connected to a source of pressurized air and to a source of vacuum through the cam operated valve 212 previously mentioned. Referring now to FIG. 13, it is seen that the supply line 211 is connected internally of the transfer bar 128 with a plurality of openings 128a which extend from a passage 128b downwardly through the lower surface of the transfer bar 128. The lower surface of the transfer bar 128 is provided with a covering 294 of rubber or other resilient material. Of course, the cover 294 has openings 294a that are aligned with the openings 128a in the transfer bar 128.

As was previously mentioned in connection with FIG. 6, the pallet 42 has a pair of upstanding knife edges 45a and 45b formed at the ends of the hardened steel center strip 44. The knife edges 45a and 45b cooperate with a breaker foot assembly 295 (FIG. 12) secured to each end of the transfer bar 128 to break off the strips 34 of glass from the glass ribbon 81 at the ends of the pallet 42. Referring now to FIG. 13, it is seen that the breaker foot assembly 295 comprises a block-like member 296 secured to the end of the transfer bar 128 by a bolt 297. A strip-like member 298 having a vertical portion 298c formed at its upper end is carried by the block 296. A breaker foot 300 is formed on or secured to the lower end of the member 298, and is provided with a covering 301 on its lower surface of a resilient material such as rubber or the like. A bolt 302 extends through the slot 298b in the member 298 and is threaded into the block 296 to permit vertical movement of the member 298. The member 298 is spring mounted on the block 296 by means of a bolt 303 that extends through the horizontal portion 298c of the member 298. A bushing 304 surrounds the bolt 303 so that the bolt may be tightened down securely, and a spring 305 surrounds the bushing 304 and bears against the head of the bolt 303 and the upper surface of the horizontal portion 298c of the member 298. Thus, when the breaker foot 300 comes in contact with the glass ribbon 81 lying across the upstanding knife edges 45a and 45b formed on the pallet 42, sufficient pressure is exerted on the glass ribbon 81 to break it off at the knife edges 45a, 45b below the breaker foot 300. Because of the resilience of the spring 305, the breaker foot 300 can move upwardly so that insufficient pressure is exerted to damage either the breaker foot 300 or the upstanding knife edges 45a, 45b on the pallet 42.

FIG. 14 is a plan view of the mechanism for placing the foil on the glass dielectric strips 35 on the pallet 42, and also shows the stop 286 previously mentioned in connection with FIG. 12. The position of the stop 286 determines how far the foil feed mechanism 147 advances the strips 136a of foil under the cutting mechanism 166, and, hence, determines the length of the small metallic foil plates 35 that are cut from the longer strips 136a. It is seen in FIG. 14 that the stop 286 is mounted on a plate 306 that extends all the way from the stop 286 to the front of the machine (to the left, as seen in FIG. 14). The plate 306 is provided with beveled edges as at 306a, 306b, 306c, and 306d. A plate 307 overlaps the beveled edges 306a and 306b, and a similar plate 308 overlaps the edge 306c. Plates 309, 310, and 311 overlap portions of the edge 306d. The plates 307, 308, 309, 310, 311 serve as guides to prevent transverse movement of the plate 306 while permitting movement toward the front and rear of the apparatus.

The position of the plate 306, and hence the stop 286, is adjustable toward the front and rear of the apparatus (to the left and right, as seen in FIG. 14). The adjustment is made by means of a screw 312 provided on its outer edge with a knurled knob 313.

As most clearly seen in FIG. 15, the screw 312 extends through a block 314 secured to the bed-plate 93 of the apparatus. The knob 313 on the outer end of the screw 312 and a collar 315 affixed to the screw on the other side of the block 314 maintain the screw 312 captive. The inner end of the screw is threaded through a pair of blocks 316 and 317 which are fixed to the plate 306 which carries the stop 286. Thus, turning the knob 313 adjusts the plate 306 and the stop 286 toward the front and rear of the apparatus.

The position of the stop 286 may be indicated by a pointer 318 carried by the plate 306 on a scale 320 fixed to the guide plate 309 (FIG. 14). A vernier may be provided by a scale 313a marked on the knob 313 and an index 321 secured to the block 314.

As previously mentioned in connection with FIG. 7, the transfer bar 128 is supported between two side members 187 and 188 which are pivoted at their ends remote from the transfer bar 128, as at 191. The side members 187, 188 are joined by the cross bar 190 and a pair of strengthening bars 322 and 323 as well as by the transfer bar 128 (FIG. 14).

The transfer bar 128 must be movable in two directions in order to pick up the small metallic conductive plates 35 from the cutter mechanism 166 and deposit them in the proper position on top of the strips 35 of glass dielectric on the pallet 42. The bar must be capable of movement upwardly and downwardly to pick up the plates and deposit them in proper position, and it must also be capable of movement back and forth from the front to the rear of the apparatus in order to bring the plates from the cutter mechanism to the pallet. The upward and downward motion is provided by rotating the side members 187, 188 about the pivots 191 at the front end of the plate 192. The side members 187, 188 are rotated by means of cams 202 and 203 which engage the undersurface of the cross bar 190. The cams 202, 203 are mounted on a shaft 204 which is supported in suitable brackets 324 and 325. The cam 202 has a backwardly extending portion 202a which is pivotally secured to the lever 205 by means of a nut and bolt combination 326. As previously mentioned, the lever 205 is cam operated to pull downwardly the rear portion 202a of the cam 202. This causes the shaft 204 to rotate and the cams 202 and 203 bearing against the undersurface of the cross bar 190 lift the side members 187, 188 and the transfer bar 128 upwardly. Conversely, as the rear end 202a of lever 202 moves upwardly, the transfer bar 128 is lowered.

Movement of the transfer bar 128 toward the front and rear of the apparatus is accomplished by moving the plate 192 on which the side members 187, 188 that carry the transfer bar 128 are mounted. The plate 192 is mounted for sliding movement on a pair of rods 193 and 194 which are supported between front walls 327 and 328, respectively, and a rear wall 330 of an open-topped, box-like structure. The rear wall 330 of the structure is provided with pads 333 and 334 which surround the rods 193 and 194, respectively; and against which the rear edge of the plate 192 may bear to define its limit of its travel toward the rear of the apparatus.

Movement of the plate 192 toward the front of the machine (to the left, as seen in FIG. 14) is limited by contact with a pair of adjustable stops 221 and 335, respectively, mounted on the plates 93 and 306. The construction and operation of the stops 221 and 335 will be later explained in detail.

It was mentioned in connection with FIG. 7 that the plate 192 is moved on the rods 193, 194 by means of a lever 195. The lever 195, only the upper part of which is shown in FIG. 15, is pivoted near its lower end and is actuated by means of the cam 198 previously described. The cam 198 causes the upper end of the lever 195 to move to the left and right as seen in FIG. 15.

In order that the stop 335 which engages the button 336 to limit the movement of the plate 192 to the left, may be set at various positions, a resilient coupling is provided between the lever 195 and the plate 192. As seen in FIG. 15, the plate 192 is provided with a bore 338 extending inwardly from the front edge of the plate 192 adjacent the stop 335. Located within the bore 338 is a cup-shaped member 340 having a pair of arms 340a extending backwardly from the cup, as best seen in FIG. 16. The upper end of the lever 195 is rotatably secured between the arms 340a by means of a pin 341 extending through the arms and the lever. Because the upper end of the lever 195 moves in an arcuate path rather than a straight line path, the lever 195 may be slotted as at 195a to accommodate that motion.

The cup-shaped member 340 is urged toward the right (as seen in FIG. 15) by a spring 342 which is interposed between the cup-shaped member 340 and a plug 343 threaded into the outer end of the bore 338. As the upper end of the lever 195 moves to the left as seen in FIG. 15, that motion is coupled through the spring 342 to the plate 192. If one of the buttons 336 or 337 engages one of the stops 221 or 335 before movement of the lever 195 is completed, the further movement of the lever 195 serves only to compress the spring 342 and does not move the plate 192. When the lever 195 moves to the right, the motion is positively coupled to the plate 192 through the arms 340a on the member 340 which engage the end of the bore 339 in the plate 192.

It will be recalled that with reference to FIGS. 2 and 3, it was stated that adjacent layers of the metallic conductive plates 35a, 35b, 35c extend over the longitudinal edges of the glass dielectric strips 34a, 34b, in opposite directions. It is apparent that in order to place the metallic plates in those positions the plate 192 carrying the transfer bar 128 (FIG. 14) must move to the left by different amounts for alternate layers of metallic conductive plates. It is to control these different amounts of movement that the two stops 335 and 221 are provided. It is seen in FIG. 14 that the stop 335 permits movement of the plate 192 to the left by a greater amount than does the stop 221. Therefore, the stop 335 controls the position of those layers of metallic plates which extend over the edge glass dielectric strips toward the front of the apparatus (to the left, as seen in FIG. 14), and the stop 221 controls the position of the layers of plates that extend over the strips toward the rear of the apparatus.

Referring now to FIG. 14, it is seen that the stop 335 comprises a screw 345 which is threaded through a pedestal 346 fixed to the movable plate 306 previously described. The screw 345 may be provided on its outer end with a knurled knob 347 and the setting of the screw 345 may be determined from the position of the knob 347 relative to a scale 348 fixed to the top of the pedestal 346. By mounting the stop 335 on the plate 306, whose adjustment determines the lengths of the conductive plates, the adjustment of plate overlap is made independent of the plate length.

The stop 221 is provided to stop the motion of the plate 192 and the transfer bar 128 at the proper position to place those layers of metallic plates 35 that extend over the glass dielectric strips 34 in the direction opposite to those controlled by the stop 335. Because alternate layers of metallic plates extend over the edges of the glass dielectric strips in the same direction, it is apparent that the stop 221 must intercept the movement of the plate 192 only on alternate movements of the plate toward the front of the apparatus.

Referring now to FIG. 17, it is seen that the stop 221 is movable upwardly and downwardly so that during alternate movements of the plate 192 theretoward the stop may move upwardly and not engage the button 335 on the forward edge of the plate 192. The stop 221 comprises a screw 350 threaded through a bar 351, which is retained in guides 352 formed in a pedestal 353 attached to the base plate 93 of the apparatus. The bar 351 is maintained in contact with the guides 352 by a retaining plate 354 which may be secured to the pedestal 353 as by screws 355. The bar 351 extends downwardly through an opening in the base plate 93 of the apparatus, and at its lower end is connected to the rod 222 previously described with reference to FIG. 7.

Referring now to FIG. 7, it is seen that the rod 222 is moved upwardly and downwardly through the action of the crank 223, which is controlled by the cam 226. As was previously explained, the shape of the cam 226 and its speed of rotation are such that the rod 222 moves upwardly during every other revolution of the main cam shaft 51. Thus, referring to FIG. 14, as the transfer bar 128 reciprocates back and forth toward the front and rear of the apparatus, the button 336 formed on the front edge of the plate 192 contacts the end of the screw 350 of the stop mechanism 221 only on alternate reciprocations of the plate 192. During the other reciprocations the screw 350 is moved upwardly so that the button 336 does not engage it, and the button 337 may engage the end of the screw 345 of the stop 335.

E. *Electrical circuitry*

FIG. 18 illustrates the electrical circuit of the stacking means. Reference will be made to other figures, primarily to FIG. 7, in order to describe the physical location of the various elements shown schematically in FIG. 18.

Referring now to FIG. 18, it is seen that the stacking means may be energized from the conventional 110 volt 60 cycle alternating current source (not shown) supplied to the lines 360 and 361. Power is provided to the equipment from the lines 360, 361 through a relay 362 whose operating winding is connected between the supply lines 360 and 361 through a normally open "on" switch 363 and a normally closed "off" switch 364. When the "on" switch 363 is momentarily closed, the line 360 is connected to a conductor 365 through contacts 362a of relay 362. Another pair of contacts 362b on the relay 362 serves to seal in the relay by short circuiting the normally open "on" switch 363. A third set of contacts 362c on relay 362 connects the line 361 to a conductor 367.

As was previously mentioned with reference to FIG. 7, the equipment embodies three motors—the main drive motor 52, the motor 83 that drives the glass supply reel 82, and the motor 144 that drives the foil cutting knives 142. Those three motors are shown in FIG. 18 connected in parallel between the conductors 365 and 367. The motors 52, 83, and 144 are energized as soon as the start switch 363 is closed and relay 362 is energized.

The motor 83 that drives the glass reel supply 82 is of the conventional split phase type having a pair of windings 83a and 83b. In order for the motor 83 to rotate, there must be a phase difference between the voltages across its windings 83a and 83b. In the present case, this phase difference is obtained by providing a capacitor 368 in series with the winding 83b. Referring again to FIG. 7, it was mentioned that a switch may be mounted on the pressure arm 84 around which the glass ribbon 81 is fed. FIG. 18 shows such a switch 370 connected across the capacitor 368. When the normally closed switch 310 is open, there is a phase difference of substantially 90° between the voltages across the windings 83a and 83b of the split phase motor 83 and so the motor rotates. However, when the glass ribbon 81 is not being fed, the pressure arm 84 does not move, and the switch 370 is closed. In that case the capacitor 368 is short circuited and the voltages across the windings 83a and 83b of the motor 83 are in phase. Thus, the motor 83 does not rotate.

When power is supplied to the conductors 365 and 367, relays 371 and 372 are energized. The operating windings of relays 371 and 372 are connected between the conductors 365 and 367 through a switch 373 having contacts 373a and 373b and a pole 373c. The switch 373 was previously mentioned with reference to FIG. 7 as being located to be actuated by the pallet as it is indexed into the proper position for the stacking cycle to begin. The switch 373 is illustrated in FIG. 18 in the condition it assumes when a pallet is not in position, wherein the pole 373c engages contact 373a.

When relay 371 is energized, its contacts 371a connect a counter reset solenoid 374 between the lines 365 and 367 to energize the solenoid. The solenoid 374, when energized, resets to zero the counter 232 previously described to prepare the counter for counting the number of layers of glass strips 34 and conductive plates 35 to be stacked on a pallet 42.

The relay 372, which is energized along with relay 371 through switch 373, operates to connect the eject solenoid 80 between the conductors 365 and 367 through contacts 372a. The eject solenoid 80 was previously described with reference to FIG. 7 as being that solenoid which, when energized, causes the finger 75 to be withdrawn from the path of the pallet 42 and depresses the glass exhaust box 238 in order that a pallet may be ejected across the top of the box.

After power has been provided to the conductors 365 and 367 through the relay 362 to energize the motors 52, 83, 144, and the relays 371 and 372, no further action takes place until a normally open "start" switch 376 is momentarily closed. The operating windings of a pair of relays 377 and 378 have one end connected to the conductor 365 and the other end connected through "start" switch 376 and through a normally closed "stop" switch 380 to the conductor 367. Thus, when the "start" switch 376 is momentarily closed, the relays 377 and 378 are energized. Contacts 378a of the relay 378 serve to short circuit the "start" switch 376 and seal in the relays 377 and 378.

The relay 377 has two pairs of contacts 377a and 377b. The contacts 377a connect one end of the control winding of the belt feed solenoid 67 to the conductor 367. The other end of the control winding of the belt feed solenoid 67 is connected to the conductor 365. As was previously mentioned with reference to FIG. 7, the belt feed solenoid 67, when energized, causes the clutch 66 to be engaged through which power is supplied to drive the pallet feed belt 74. Thus, when the relay 377 is energized, the pallet feed belt 74 moves to position the pallet 42 properly for the stacking operation.

When a pallet 42 has been moved by the feed belt 74 toward the proper position for the stacking operation, the pallet 42 actuates the switch 373 and causes its pole 373c to move from contact 373a to contact 373b, thus opening the circuit through the energizing windings of relays 371 and 372. Contacts 371a of relay 371 open to deenergize the counter reset solenoid 374 and prepare the counter 232 for the stacking operation. The contacts 372a of relay 372 are also opened to deenergize the eject solenoid 80 and cause the finger 75 to move upwardly so that it engages the strip 47 across the bottom of the pallet 42 (FIG. 6) and properly positions the pallet for the stacking operation.

Simultaneously, the clutch solenoid 57 which controls the rotation of the main cam shaft 51 is energized. The actuating winding of the clutch solenoid 57 is connected directly to conductor 365 and through a pair of normally closed contacts 381a of a relay 381, through the contacts 377b of energized relay of 377, and through normally closed contacts 372b of relay 372 to conductor 367.

The remainder of the circuit shown in FIG. 18 comprises relays and switches for controlling the eject mechanism, which ejects a pallet from the apparatus either automatically, when a predetermined number of layers of metallic plates and glass dielectric strips have been built up thereon, or manually under the control of an operator.

As previously mentioned with reference to FIG. 7, the counter 232 is of the type which, when it has been mechanically actuated a predetermined number of times, operates to close a switch. Referring now to FIG. 18, the switch which is closed by the counter after the predetermined number of counts is designated by the numeral 382 and is connected in series relationship with the energizing winding of the relay 381 between the conductors 365 and 367. When the switch 382 is closed and the relay 381 is energized, its normally closed contacts 381a open to deenergize the clutch solenoid 57 and stop the stacking operation, and its normally open contacts 381b close. The contacts 381b are connected in series with the eject solenoid 80 between the conductors 365 and 367 and, hence, when they close the eject solenoid 80 is actuated. It will be recalled that the eject solenoid 80, when energized, lowers the finger 75 which has positioned the pallet 42 during the stacking operation and also lowers the glass exhaust box 238 to enable the pallet 42 to be ejected over the top thereof.

If, for some reason such as jamming of the mechanism, it is desired to eject a partially stacked pallet 42, a normally open switch 383 is momentarily closed by an operator. The switch 383 is connected in series relationship with the operating winding of a relay 384 between the conductors 365 and 367. When the relay 384 is energized by closing the switch 383, its contacts 384a close to energize the operating winding of the relay 381 previously mentioned. The relay 381, of course, deenergizes the clutch solenoid 57 and energizes the eject solenoid 80 as previously described. A second pair of contacts 384b of the relay 384 are closed to seal in the relay 384 through the switch 373 whose pole 373c is now engaging contact 374b.

After the pallet 42 has been ejected from the stacking means, the pole 373c of switch 373 engages contact 373a to deenergize the relays 384 and 381 and energize the relays 371 and 372 as previously described. The mechanism is then ready to have a new pallet positioned for the stacking operation.

The conditions of the various solenoids, switches, and relays for several conditions of the stacking means are shown in the following table:

| Condition | Switches | | | | | | | Relays | | | | | | | Solenoids | | | |
|---|---|---|---|---|---|---|---|---|---|---|---|---|---|---|---|---|---|---|
| | 363 | 364 | 376 | 380 | 373 | 382 | 383 | 362 | 377 | 378 | 371 | 372 | 381 | 384 | 67 | 80 | 57 | 374 |
| Power "on" switch 363 momentarily closed, no pallet in place | X | — | — | — | — | — | — | X | — | — | X | X | — | — | — | X | — | X |
| "Start" switch 376 momentarily closed, no pallet in place | — | — | X | — | — | — | — | X | X | X | X | X | — | — | X | X | — | X |
| Pallet in place and stacking proceeding | — | — | — | — | X | — | — | X | X | X | — | — | — | — | X | — | X | — |
| Stacking completed and switch 382 closed by counter | — | — | — | — | X | X | — | X | X | X | — | — | X | — | X | X | — | — |
| Partially stacked pallet being manually ejected | — | — | — | — | X | — | X | X | X | X | — | — | X | X | X | X | — | — |
| Pallet ejected, new one not yet in place | — | — | — | — | — | — | — | X | X | X | X | X | — | — | X | X | — | X |

— indicates switches in normal position, relays and solenoids de-energized.
X indicates switches actuated, relays and solenoids energized.

It is apparent that the electrical circuit of the stacking means is shown in FIG. 18 in simplified form, and that various interlocking switches may be utilized in the circuit. It is believed that such features may be well understood by one skilled in the art, and a detailed description thereof is unnecessary.

IV. THE WELDING MEANS

When the stack of alternate layers of metallic conductive plates 35 and strips 34 of glass dielectric are ejected from the stacking means, they are transferred to the welding means, which is illustrated in FIGS. 19 through 23. The pallets 42 on which the stacks are assembled may be transported from the stacking means to the welding means by means of a conveyor (not shown), or they may be manually moved between the two sections of the apparatus. The function of the welding means is to cold weld the electrical leads 36a, 36b onto the metallic conductive plates 35 that extend over the outer edges of the glass dielectric strips 34 comprising each stack. Two general mechanisms are embodied in the welding means—first, means for feeding pallets into and through the apparatus and second, means for feeding wire into the apparatus, cutting the wire to provide electrical leads of the proper length, preparing the end for welding, and cold welding the electrical leads to the plates of the capacitors.

A. The pallet feed mechanism

FIG. 19 is a skeletonized perspective view of the welding means, showing in particular the means for advancing the pallets, as well as the general control means. The pallets 42, each bearing a stack of partially completed capacitor elements, are stacked in a hopper 400, from which they are fed from the bottom into the welding means by means to be described hereafter.

The pallets are fed one at a time from the hopper 400 into the welding means by a feed bar 401, having a plurality of notches 401a formed in its upper surface. The feed bar 401 is of a size and shape to fit into one of the channels 46a or 46b formed on the under surface of the pallet 42 (FIG. 6). The transverse strip 47 across the bottom of the pallet fits into one of the notches 401a. The feed bar 401 is reciprocal in an upward and downward direction, as well as in the longitudinal direction, and is provided with a pickup mechanism 402 on its end nearest the hopper 400. In operation, the feed bar 401 is moved downwardly and backwardly by means to be later described in detail until it is under the hopper. Then, as the feed bar 401 moves upwardly, the pickup mechanism 402 engages the transverse strip 47 on the pallet, and as the feed bar 401 moves forwardly again, the pallet is advanced into the welding means.

Referring now to FIG. 20, it is seen that the pickup mechanism 402 comprises a pair of parallel levers 403a and 403b pivotally attached to the end of the feed bar 401, as at 404. The other ends of the levers 403a, 403b are secured to an upwardly extending finger 405, which fits into one of the channels 46a or 46b formed on the bottom of the pallet 42, as previously mentioned, and the finger 405 engages the strip 47 across the bottom of the pallet. The finger 405 is maintained in the proper position to engage the strip 47 by means of a leaf spring 406, which is secured to the end of the feed lever 401 as by a screw 407, and on which the finger 405 rests. The reason for utilizing the resilient pickup mechanism 402 rather than a rigid structure is to prevent damage to the equipment should a pallet become jammed in the hopper 400.

As the pallet 42 is advanced through the apparatus, it rests on a bar 408 which is part of, or attached to, the supporting structure (not shown in FIG. 19). The feed bar 401 is arranged alongside the bar 408.

Movement of the feed bar to advance the pallets 42 into and through the welding means is intermittent and is controlled by cams 409 and 410 mounted on a shaft 411. The shaft 411 is rotated by a chain 412 engaging a sprocket 413 secured to the shaft. The chain 412 is driven by a motor 414. The motor 414 is supplied with electrical power from a suitable source in the conventional manner.

The feed bar 401 is shown in its downward position just before starting its movement toward the hopper 400 to pick up another pallet. The upward and downward position of the feed bar 401 is controlled by the cam 409, which engages the lower portion of a lever 415. The lever 415 extends upwardly at one side of the feed bar 401 and is joined to another lever 416 by a pin 417 that extends through a slot 401b formed in the feed bar 401. The levers 415 and 416 are both pivoted on a shaft 418 located below the feed bar 401.

The lever 416 is joined at its lower end by a rod 420 to a pair of levers 421a and 421b which extend one on either side of the feed bar 401 and are joined together by a pin 422 which extends through a longitudinal slot 401c formed in the rear portion of the feed bar 401. The levers 421a and 421b are pivoted on a shaft 423. As the cam 409 rotates in the direction shown and the low portion of the cam 409 comes into contact with the lever 415, the lower end of the lever 415 will move to the right, as seen in FIG. 19. As the lower end of the lever 415 moves to the right, it pivots about the shaft 418, whereby its upper end moves to the left carrying the lever 416 with it. Because the lower end of the lever 416 is joined to the lower ends of the levers 421a and 421b, a similar motion of the levers 421a and 421b is caused. As the levers 415 and 416 pivot about the shaft 418, the pin 417 joining the levers through the slot 401b follows an arcuate path about the shaft 418 as the center; the pin 422 joining the levers 421a and 421b follows a similar path about the shaft 423 as the center. Thus, as the pins 417 and 422 move from the off-center position shown, they raise the feed bar 401 upwardly, whereby the pickup mechanism 402 may engage the bottom pallet stacked in the hopper 400 and the notches 401a may engage the pallets which are in the process of being advanced through the mechanism. Conversely, of course, the high portion of the cam 409 causes the feed bar to move downwardly to disengage itself from the pallets.

The longitudinal or backward-and-forward motion of the feed bar 401 is controlled by the cam 410. The cam 410 is engaged by a follower wheel 424 rotatably secured between a pair of levers 425a and 425b. The levers 425a and 425b are pivoted at their upper ends, as on shaft 426, and are joined together at the back by a plate 425c. The plate 425c in turn is engaged by a follower wheel 427 rotatably secured to one end of a rod 428. The rod 428 is movable upwardly and downwardly on a lever 430 which extends through an opening in the rod 428 and a thumb screw 431 may be provided to fix the position of the rod 428 on the lever 430. The lever 430 is pivoted at its lower end on a pin 432, on which are also pivoted a pair of levers 433a and 433b located on each side of the lever 430. The levers 433a and 433b are pivoted at their upper ends as on pins 434a and 434b secured to arms 435a and 435b on the supporting structure of the welding means. The levers 433a, 433b are held against a stop 435c on the supporting structure by a spring 439 which extends from the lever 430 to an arm 420a on the rod 420. The spring 439 serves to maintain the follower 424 and the lever 415 in contact with the cams 410 and 409, respectively. By employing the levers 433a, 433b and spring 439 and leaving the pin 432 free to move, a resilient connection is provided for the lever 430 to prevent damage to the equipment in case of jamming.

The upper end of the lever 430 is secured to the end of the feed bar 401 by means of a link 436. As the cam 410 rotates in the direction shown and the low portion of the cam reaches the follower wheel 424, the levers 425a and 425b rotate in a clockwise direction about the pivot 426 and cause the lever 430 to rotate in a counterclockwise direction about the pin 432. Thus, the feed bar 401 is moved toward the rear, i.e., toward the hopper 400. Of course, the movements are reversed when the high portion of the cam 410 reaches the follower wheel 424.

The relative positions of the cams 409 and 410 on the shaft 411 are such that the feed bar mechanism 401 moves downwardly to disengage itself from the pallets 42 before it starts to move toward the rear to pick up a new pallet and, of course, moves upwardly to engage the pallets before it starts to move again in the forward direction.

When the size of the capacitors to be welded is changed, it is necessary to make several adjustments in the apparatus. First, another feed bar 401 must be provided having its slots 401a correctly spaced apart for the particular size of capacitor to be welded. In addition, the amount that the feed bar 401 moves forwardly and backwardly under the influence of cam 410 must be adjusted. This may be done easily by loosening thumb screw 431 on the rod 428 and moving it upwardly or downwardly to vary the amount of forward and backward movement of feed bar 401. Various other adjustments may be necessary, but these are believed to be obvious to one skilled in the art.

B. *The wire feeding, cutting, and welding mechanism*

As each pallet 42 bearing a stack of partially completed capacitors is intermittently advanced through the welding means, the pallet passes under five pairs of welding assemblies, one pair 437a and 437b of which is shown in FIG. 19. The five pairs of assemblies are identical and hence only one pair 437a, 437b will be described in detail. The welding assemblies 437a and 437b of each pair comprise castings 438a and 438b respectively, which carry wire feed mechanisms designated generally by the numerals 440a and 440b respectively, and welding mechanisms which are contained within the castings and are not shown in FIG. 19. Both the wire feed mechanism 440a, 440b and the welding mechanisms (not shown) are hydraulically operated. Hydraulic cylinders 441a and 441b actuate the wire feed mechanisms 440a and 440b respectively, and hydraulic cylinders 442a and 442b operate the welding mechanisms. Fluid under pressure is supplied to the hydraulic cylinders 441a, 441b from lines 443 and 444, the fluid supplied to one line serving to advance the mechanism and the fluid supplied to the other line serving to retract the mechanism in the conventional fashion of hydraulic devices. The hydraulic lines 443 and 444 are supplied through a conventional hydraulic valve 445. A hydraulic line 446 from the valve 445 is connected to a conventional source of fluid under pressure (not shown). The valve 445 operates to connect the supply line 446 to either the line 443 or the line 444, depending upon the position of the valve which is controlled by a cam 447 mounted on the shaft 411.

Similarly, the hydraulic cylinders 442a, 442b that actuate the welding mechanisms are provided with hydraulic fluid through lines 448 and 450, which are connected to a valve 451 similar to valve 445. The supply line 446 is also connected to the valve 451. The valve 451 is actuated by a cam 452 mounted on the shaft 411 to supply hydraulic pressure through the line 448 or the line 450 to advance or retract the welding mechanisms in the conventional manner.

FIG. 21 is a vertical sectional view through the welding assemblies 437a and 437b showing the wire feed mechanism 440a and a welding mechanism 453 in detail. Because the assemblies 437a and 437b are essentially mirror images of each other, only the assembly 437a will be described in detail.

Looking first at the wire feed mechanism 440a, it is seen that wire 454 may be supplied from a feed roll 455 to the mechanism. The wire feed mechanism 440a is reciprocal from left to right (as seen in FIG. 21) under the control of the hydraulic cylinder 441a. The wire feed mechanism 440a rides on a plate 456 secured to the supporting structure 435 and is retained between longitudinally extending guides (not shown) to prevent transverse movement thereof.

The wire feed mechanism 440a includes a block-like member 457 having a body portion 457a which rides on the plate 456, a top portion 457b over which the wire 454 passes, and end portions 457c and 457d. The wire 454 passes through channels formed in plates 458a and 458b that are secured to the top portion 457b of the member 457. As best seen in FIG. 22, the body portion 457a of the member 457 is also provided with a vertical opening into which fits a frame-shaped movable member 459 having a top portion 459a. An actuating element 460 extends into a longitudinal opening in the body portion 457a of member 457 and through the center of the frame-like member 459.

The actuating element 460 is secured at one end to the piston 441b of the hydraulic cylinder 441a, and near its other end has an inclined lower surface 460a. The inclined lower surface 460a engages a complementary surface 459b formed on the inner lower surface of the frame-like member 459.

The block-like member 457 is provided with a plurality of coil springs 461 which extend transversely through the body portion 457a and, through suitable shoes (not shown), engage the guides (not shown) on each side of the wire feed mechanism. Thus, the member 457 resists movement from left to right and right to left, as seen in FIG. 21.

When the wire feed mechanism 440a is in its retracted position (toward the left in FIG. 21), an adjustable stop screw 462 on the end portion 457c of member 457 engages a stop 463 on the casting 438a. Then, as the piston 441b moves to the right, the springs 461 cause the member 457 to resist the motion to the right, and the inclined surface 460a on the actuating element 460 engaging the surface 459b formed on the frame-shaped member 459 causes the member 459 to be pulled downwardly. The member 459 is continually urged upwardly by springs 465 that surround pins 466 which extend through a plate 467 on top of the member 459 and into the block-like member 457.

The top portion 459a of the frame-like member 459 carries a pair of pins 468a and 468b which are urged downwardly by springs 470a and 470b, respectively, interposed between the upper ends of the pins 468a and 468b and the top plate 467.

The frame-like member 459 also carries a punch 471 which is solidly set into the top portion 459a of member 459. Thus, as the member 459 is moved downwardly under the action of the actuator 460, the spring-loaded pins 468a and 468b engage the wire 454 passing thereunder and hold it against an insert 472 set into the top of portion 457b of the member 457. Then, as the frame-like member 459 is moved downwardly still further, the punch 471 engages the wire 454 and holds it tightly against the insert 472. Therefore, as the entire feed mechanism 440a moves from left to right under the action of the hydraulic cylinder 441, the wire 454 is advanced therewith.

After the wire feed mechanism 440a has reached the limit of its travel to the right, as determined by the setting of a stop screw 473 threaded into the main casting 438a, movement of the body portion 457 is stopped. However, the actuator 460 continues to move and causes the frame-like member 459 to be pulled still further downwardly. This action causes the punch 471 to flatten the wire 454 against the insert 472. The flattened portion of the wire is later welded to the capacitor plates.

Referring still to FIG. 21, the welding mechanism 453 serves to cut leads of the proper length from the length of wire 454 and to weld those leads to the metallic conducting plates 35 which extend outwardly over the edges of the glass dielectric strips 34 comprising the stack of partially completed capacitors. As previously mentioned, movement of the welding mechanism 453 is controlled by the hydraulic cylinder 442a whose piston 442b is threaded into the upper portion of a block 474 that carries the other elements of the mechanism. The block 474 is movable in an upwardly and downwardly direction on ways (not shown) formed on the casting 438a. The cutting operation is performed by a blade 475 secured to the block 474 which, on the downward stroke of the piston 442b, enters an aperture 475a between a pair of plates 475b and 475c set into the casting 438a. The left edge of the blade 475 cooperates with the right edge of the plate 475b to cut the wire 454 substantially through the middle of the flattened portion, and the right edge of the blade 475 cuts the wire beyond the flattened portion.

The lead wires cut by the blade 475 are cold welded to the metallic plates of the capacitor by means of a weld punch 476 which is also carried by the block-like member 474. The weld punch 476 is mounted on a movable member 477 mounted in the block 474. The movable member 477 carrying the cold weld punch 476 is urged downwardly by a spring 478 contained in a bore 474b in the member 474. The spring 478 is interposed between the upper end of the bore 474b and a head 477a formed on the upper end of the slideable member 477.

The construction and operation of the welding mechanism 453 can best be explained with reference to FIG. 23 which is an exploded perspective view of the mechanism. The cutting blade 475 fits into a recess 474c formed in the block 474. The blade is retained in position by means of a plate 480 that may be secured to the block 474 over the blade 475 by means of screws 481.

The block-like member 474 is also provided with a cut-a-way portion 474d from which the bore 474b extends upwardly. A channel-shaped member 482 fits into the cut-a-way portion 474d of the block 474 and the slideable member 477 previously mentioned fits within the channel 482a of the member 482. The head 477a of the slideable member 477 extends upwardly into the bore 474b of the member 474, and the spring 478 interposed between the head 477a and the upper end of the bore 474b urges the slideable member 477 downwardly. The member 477 is retained within the channel 482a because its head 477a will not pass the top of the member 482.

The slideable member 477 also carries a plate 483 and the weld punch 476 previously mentioned. The plate 483 and the weld punch 476 may be conveniently secured to the member 477 by screws (not shown).

The plate 483 carries a wire guide 484 formed in the shape of a W. The wire guide 484 is mounted on a plate 485, which in turn is mounted on a pair of pins 486a and 486b. The pins 486a and 486b extend upwardly through blocks 487a and 487b respectively secured to the lower edge of the plate 483. Springs 488a and 488b surround the pins 486a and 486b respectively, and are interposed between the blocks 487a and 487b and the plate 485. Thus, the wire guide 484 is urged downwardly by the springs 488a and 488b.

When the unit is assembled, the weld punch 476 slideably fits within a slot 490a extending upwardly into an outer plate 490. Screws 491 extend through the outer plate 490, the channel-shaped member 482, and into the block 474 to secure the various elements of the unit securely together. In operation, as the block 474 moves downwardly under the urging of the hydraulic piston 442b threaded into the block, as at 474a, the wire guide 484 first contacts the lead wire and properly centers it for cutting and welding. Then, as the block 474 continues to move downwardly, the blade 475 cuts the wire to the proper length. At the same time, the weld punch 476 contacts the wire and as the block 474 moves further downwardly, the weld punch 476 moves upwardly with the slideable member 477 against the force of the spring 478. Then, when the block 474 has moved downwardly a sufficient amount, the upper surface 476a of the weld punch 476 engages the top of the slot 490a cut in the cover plate 490. As the block moves downward still farther, force is transmitted directly to the weld punch from the block 474 through the cover plate 490, and the electrical lead is welded in place. The welding force is exerted through the lead wire and the edges of the capacitor plates against the hardened steel strip 44 secured to the pallet 42. The pallet, of course, is resting on the bar 408.

Referring again to FIG. 19, the cams 409, 410, 447, and 452 are shown in their positions just after the weld has been completed. The feed bar 401 is in its lowermost position. As the shaft 411 continues to rotate, first the cam 410 causes the feed bar 401 to move to the rear toward the hopper 400 to pick up a new pallet 45 and to advance the pallets already in the unit. When the pickup device 402 is underneath the pallet in the proper position, the cam 409 causes the levers 415, 416, and 421 to rotate in a counterclockwise direction to raise the feed bar 401 upwardly and engage the pallets. Then the cam 410 causes the feed bar to be moved forward again, i.e., to the right, as seen in FIG. 19, and cam 409 causes the feed bar to move downwardly to seat the pallets 42 on the bar 408.

When the pallets 42 are resting on the bar 408, the cam 447 actuates the hydraulic valve 445 to cause pressure to be applied through the line 443 to the wire feed mechanism 440a and 440b to advance the wire into the apparatus. When the wire has been advanced, the cam 452 then actuates hydraulic valve 451 to cause hydraulic pressure to be applied to the line 448 to actuate the welding mechanisms 453 and cause the lead wire to be cut and welded to the capacitor plates. While the weld is being made, the cam 447 again actuates the valve 445 and retracts the wire feed mechanism 440 by applying pressure through the line 444. After the weld has been completed, the cam 452 actuates valve 451 to apply pressure through line 450 to raise the welding mechanism from its lowered position. The cycle is then repeated.

It is apparent that the individual capacitors making up each stacked strip are small compared to the width of each of the welding assemblies 437a and 437b. Thus, it becomes physically impossible to have adjacent capacitors in the strip welded simultaneously. Various arrangements of spacing between the pairs of welding assemblies 437a and 437b and the amount each pallet 42 is advanced by the feed bar mechanism 401 are possible, as will be apparent to one skilled in the art. One satisfactory arrangement is to have the pairs of welding assemblies 437a, 437b spaced apart by the width of five capacitors, and to have each pallet 42 advanced by the width of six capacitors each time the feed bar 401 is actuated. Thus, as a pallet 42 passes through the five pairs of welding assemblies 437a, 437b, each capacitor has electrical leads welded thereto.

V. THE FURNACE MEANS

After the electrical leads have been welded to the capacitor plates by the welding means, an additional strip of glass may be added to the top and bottom of the stack of metallic plates 35 and glass strips 34. These outside strips preferably are heavier and wider than the strips 34 between the conductive plates 35 of the capacitors and extend completely over the conductive plates. The stack, including the heavy outside strips, may then be placed in a conventional mold and passed into the furnace means 32 (FIG. 1).

The furnace means 32 is of conventional type such as is well known in the art and readily available commercially. It is preferred that the furnace means embody annealing means to relieve any strains that may be set up in the strip of capacitors during the molding process. When the stack emerges from the furnace means, it is in the form of a unitary glass strip 37 comprising a plurality of capacitors 38 solidly joined together.

VI. THE TESTING MEANS

A. *In general*

After the unitary strips 37 of capacitors 38 emerge from the furnace means 32, they are ready for the testing means 33 which tests each individual capacitor 38, prints a color code on one surface thereof, and ejects the capacitors 38 into various chutes depending upon their electrical characteristics. Referring now to FIG. 24, the strips 37 of capacitors are stacked in a hopper, or the like (not shown), to enable the bottom strip of the stack to be engaged by a stud 500, or the like, fixed to an endless chain 501 and fed into the testing means. The chain 501 is driven by a sprocket 502 fixed on a shaft 503 to which is also fixed another sprocket 504 driven by a chain 505 from a sprocket 506. The sprocket 506 is connected to a shaft 507 through a torque limiting clutch 508 and the shaft 507 is driven by a sprocket 510. The clutch 508 is provided with a lever 508a so that it may be manually disengaged.

The clutch 508 is of the conventional friction type that slips when a certain amount of resistance is exerted against the rotation of the sprocket 506. The sprocket 510 is driven by a chain 511 which in turn is driven by a sprocket 512 mounted on the output shaft 513 of a conventional gear reducing mechanism 514. The input to the gear reducing mechanism 514 is from a main drive shaft 515 driven by a conventional motor 516 energized from an alternating current line (not shown). A gear 518 mounted on the shaft 515 engages a gear 520 mounted on a shaft 521 whose purpose will be later described.

As each unitary strip 37 of capacitors 38 is engaged by the stud 500 mounted on the chain 501 and is moved to the right, as seen in FIG. 24, it passed under a scriber mechanism indicated generally by the numeral 522. The scriber mechanism 522 comprises a scriber 523 mounted in a yoke 524 for transverse movement (as seen in FIG. 24). The function of the scriber 523 is to scribe a line between the individual capacitors 38 comprising a strip 37 in order to prepare them for breaking off into separate capacitors.

As the strip 37 of capacitors is advanced on the chain 501, the leading end of the strip contacts the end of a lever 525, pivoted as at 526, whose other end actuates a switch 527. The switch 527 is of the normally closed type whose contacts are opened by rotation of the lever 525 under the urging of the strip of capacitors. The switch 527 is connected in circuit relationship with a solenoids 528 through which a lever 529 controls a clutch mechanism 530 mounted on a cam shaft 531.

The scriber 522 is actuated by rotation of the cam shaft 531 to inscribe a line between the various capacitors 38 comprising a strip 37. A sprocket 532 mounted on the cam shaft 531 is rotated by a chain 533 which, in turn, is driven by a sprocket 534 mounted on a shaft 535. The shaft 535 is rotated by a sprocket 536 driven by a chain 537 which engages a sprocket 538 mounted on the main drive shaft 515. The main drive shaft 515, as previously mentioned, is driven by a motor 516.

The cam shaft 531 that controls the movements of the scriber 522 is driven through the clutch mechanism 530 controlled by the solenoid 528, as previously mentioned. The clutch mechanism 530 is of the single tooth variety which can be engaged at only one particular position during each revolution of the shaft 531 on which the clutch is mounted. A spring 540 urges the clutch mechanism 530 into engagement and it is necessary that solenoid 528 be energized in order to disengage the clutch mechanism.

Mounted on the cam shaft 531 is a cam 541 engaged by a follower roller 542 mounted on one end of a rod 543, on the other end of which is mounted the scriber yoke 524. The rod 543 is biased toward the cam 542 by a spring 544 mounted between a collar 545 secured to the shaft 543 and a sleeve 546 through which the rod 543 slides. The sleeve 546 has a downwardly extending arm 546a formed thereon, to which is secured a lever 547. The lever 547 is biased by a spring 548 into engagement with a cam 550 also mounted on the cam shaft 531. The cam 550 serves to rotate the sleeve 546 about a shaft 551 extending therethrough to raise and lower scriber mechanism 522. The cams 550 and 541 are arranged relative to each other in a manner such that the cam 550 causes the scriber mechanism 522 to be lowered in position to scribe a line across capacitor strip 37 just before the cam 541 causes the scriber mechanism 522 to be actuated to scribe the line.

As the individual capacitors 38 comprising each strip 37 are moved into position to be separated from the strip by the scriber mechanism 522, the end of the strip 37 engages the end of the lever 525 and opens the switch 527. This deenergizes the solenoid 528 and allows the spring 540 to urge the clutch mechanism 530 into engagement. Thus, the shaft 531 starts to rotate as each capacitor 38 comes into the proper position and the scriber mechanism 522 scribes a line across the strip 37 between two capacitors. The capacitor 38 is then broken off by a breaker arm 551a. During the time that the strip 37 is pressed against the lever 525, the chain 501 that carries the strip cannot advance. Thus, the friction clutch 508 slips.

The breaker arm 551a is also actuated from the cam shaft 531 by means of a cam 552. The breaker arm 551a is secured to one end of a lever 553 which is pivoted on the shaft 551 and whose other end is actuated by the cam 552. The end of the lever 553 is urged into contact with the cam 552 by a spring 554. After the scriber mechanism 522 has scribed a line across the strip 37 of capacitors, the breaker arm 551a is actuated by the cam 552 to tap the top surface of a capacitor 38 to break it from the strip 37. At that time, the capacitor 38 being broken off is supported on top of a bar 555. The bar 555 is mounted for rotation about a shaft 555a on which is also mounted a crank 556. The lever 553 has a depending arm 553a which engages a rod 557 secured to the crank 556. A spring 558 attached between the lever 553 and the rod 557 urges the rod upwardly. As the breaker arm 551 moves downwardly to break off an individual capacitor 38, the arm 553a depresses the rod 557 and rotates the supporting bar 555 to permit the capacitor 38 to drop downwardly into a chute 560.

The chute 560 serves to transport the individual capacitors 38 to transfer wheel 561. The transfer wheel 561 comprises a pair of parallel circular plates 562 and 563 mounted in spaced apart relationship on a shaft 564. The circular plates 562 and 563 are provided with a plurality of notches 562a and 563a respectively with each notch having inwardly diverging edges.

The shaft 564 on which the transfer wheel 561 is mounted also has mounted thereon sprocket 565 which is driven by a chain 566. The chain 566 in turn is driven by a sprocket 567 mounted on the output shaft 513 of the gear reduction mechanism 514 previously mentioned, whereby the speed of the transfer wheel 561 is synchronized with that of the chain 500, scriber mechanism 522 and breaker arm 551a. Of course, when the capacitor is changed, certain changes must be made to maintain synchronization. Such adjustments are believed to be obvious to one skilled in the art.

The circular plates 562 and 563 comprising the transfer wheel 561 extend through slots 560a and 560b respectively cut in the bottom surface of the chute 560. As the individual capacitors 38 slide down the chute toward the transfer wheel 561, the leads 36a, 36b of the capacitor enter one of the pairs of notches 562a and 563a in the plates 562 and 563. If a capacitor has a physical defect, such, for example, as having either or both electrical leads missing, it will fall through the transfer wheel 561 into a suitable receptacle (not shown).

As the transfer wheel rotates, the leads 36a, 36b of each capacitor 38 pass under a pair of wires 568a and 568b, respectively. Normally, the lower ends of the wires 568a, 568b extend into a pan 570 having silicone oil therein. As the capacitor passes under the wires 568a, 568b, the leads 36a, 36b of the capacitor raise the wires and cause a drop of silicone oil to be deposited on each lead 36a, 36b. This serves as insulation to seal the joint between the leads and the glass body of the capacitor.

As the transfer wheel 561 continues to rotate in a clockwise direction as seen in FIG. 24, the capacitors 38 slide from one edge of the notches 562a, 563a to the other edge. A pair of fingers 571 (only one of which is seen in FIG. 24) are arranged adjacent the outer surfaces of the plates 562 and 563 substantially across from the chute 560. The fingers 571 engage the leads 36a, 36b on the capacitors 38 that extend outwardly from the plates 562 and 563 and cause the capacitors to drop out of the notches 562a and 563a as the transfer wheel 561 rotates. As each capacitor 38 drops out of transfer wheel 561, it falls onto the top of a cart 572, which is part of means for conveying the capacitors through the electrical testing and color coding portions of the apparatus.

A plurality of carts 572 are secured to an endless chain 573, which is supported between sprockets 574 and 575, the sprocket 575 being shown in FIG. 25. One of the sprockets, for example, the sprocket 574, may be driven to advance the chain 573. The sprocket 574 is mounted on an axle 576 which is connected to the output of a conventional Geneva drive mechanism 577. The input to the Geneva drive mechanism 577 is from the shaft 521 previously mentioned. Thus, the carts 572 attached to the chain 573 are moved with an intermittent motion, with each movement being sufficient to advance a cart to the position previously occupied by the cart next ahead. The reason for moving the carts intermittently is to permit various tests to be performed on the capacitors carried in the carts. The various testing mechanisms are arranged adjacent to the chain 573 and the carts 572 so that the capacitors pass by each test station in succession.

As can best be seen in FIG. 25, each of the cart 572 comprises a flat body portion 572a and pairs of upwardly extending arm 572b and 572c located near the outer ends of the body portion 572a. The carts 572 are of such dimensions that a capacitor 38 lies flat on the body portion between the upwardly extending arms 572b and 572c with the wire leads of the capacitor extending between the arms of each pair.

Each cart 572 is provided with a pair of pins 578 and 580 which extend through the body portion 572a of the cart from side to side and are slideable therein. As will be later described, means are provided to position the pins in accordance with the various tests performed upon the capacitors, and the pins later actuate switches in accordance with the test results indicated by the pin position.

After each capacitor 38 is dropped into the proper position on top of a cart 572, it is subjected first to a high voltage test. The high voltage test is applied through four pair of conductors 601a and 601b, 602a and 602b, 603a and 603b, and 604a and 604b, which depend from insulating plates 605a and 605b. The pairs 601, 602, 603 of conductors are supplied with a high potential from a circuit to be later described in detail, and the conductors 604a and 604b are connected together through a resistor 606.

As each capacitor 38 moves under the plates 605a, 605b, its leads are first contacted by the conductors 601a and 601b between which exists a high potential difference. As each capacitor moves out of contact with the conductors 601a and 601b and into contact with conductors 602a, 602b, it is again subjected to a high potential; and as it continues to move, it is subjected to a third application of a high potential difference from the conductors 603a and 603b. If the capacitor 38 under test has broken down under the high potential applied thereto, it actuates a pair of solenoids 607 and 608 as the capacitor contacts the conductors 603a and 603b.

The solenoids 607 and 608 are located adjacent the pins 578 and 580 of that cart 572, six ahead of the cart carrying the capacitor being tested. This arrangements permits greater flexibility and easier mechanical arrangement than if the pins were actuated on the cart carrying the capacitor under test. If the solenoids 607 and 608 are actuated in response to a breakdown of the capacitor under test, the pins 578 and 580 are moved by the solenoid to project on the far side of the cart 572, as seen in FIG. 24. As the capacitor 38, having been tested for high potential failure, passes under the conductors 604a and 604b, any charge built up on the capacitor is discharged through the resistor 606.

After the capacitor has been tested for high potential breakdown, it is tested to determine its value of capacitance. This test occurs two stations later when the capacitor comes into contact with conductors 610a and 610b. The conductors 610a and 610b are energized from circuit means to be later described in detail.

One of the features of the testing means is that each capacitor is tested for its departure from a given value of capacitance in terms of percentage. Again, the positions of the pins 578 and 580 on the cart, six ahead of that which carries the capacitor under test, are moved to indicate the tolerance range within which the particular capacitor falls. The pins 578 and 580 are set by pin-setting solenoids 617 and 618 located on one side of the cart and solenoids 620 and 621 located on the opposite side of the cart. Depending on the value of the capacitance of the capacitor contacting the conductors 610a and 610b, one or more of the pin-setting solenoids 617, 618, 620, 621 are energized. Later, the positions of the pins 578 and 580 on the cart determine into which of a plurality of chutes the capacitor is ejected.

If a capacitor has broken down under the high potential test and the pins 578 and 580 on the information carrying cart for that particular capacitor have been moved to the far side of the cart, it is desirable to have the pins remain in that position and not be repositioned by the solenoids 620 and 621 in response to the capacitance test. In order to accomplish this, a switch 622 is provided to open the energizing circuits of the solenoids 617, 618, 620, and 621. The switch 622 is located at the same station as the solenoids 617, 618, 620, and 621 and is positioned to have its normally closed contacts opened by the pins 578 and 580 if they are set to indicate a high potential failure.

The circuitry through which the pin setting solenoids 617, 618, 620, and 621 are energized will, of course, be described in detail hereafter. It is sufficient for the present to note that if the capacitor under test is out of tolerance on the low side of the standard or desired value, the solenoid 617 is energized; and if the capacitor is out of tolerance on the high side of the standard value, solenoid 618 is energized. If the capacitor falls within a broad tolerance range on the high side of the standard value, the solenoid 621 is energized. If the capacitor falls within a narrow tolerance band, both solenoids 620 and 621 are energized.

After the capacitors have been tested for high potential failure and for their value of capacitance, they are color coded and separated into groups according to their electrical characteristics. In the present case, color coding may be accomplished by means of two printers 623 and 624, the printer 623 serving to place the proper color code on those capacitors that fall within the narrow tolerance range and the printer 624 serving to place the proper markings on those capacitors that fall within the broad tolerance range. Of course, capacitors which are outside the broad tolerance range or which have failed the high potential test are not color coded at all.

The printers 623 and 624 may be of any convenient type, and the invention is not limited to the use of any particular printer. However, it has been found that a printer which serves satisfactorily is disclosed in co-pending patent application, Serial No. 329,674, filed January 5, 1953, by George L. McFarland and assigned to the same assignee as the present application. The printer disclosed in the McFarland application may be actuated by means of solenoids to place dots of various colored inks on the upper surface of each capacitor to indicate the standard value of capacitance of the capacitor and its departure from that value in terms of tolerance ranges. The solenoids which actuate the printers 623 and 624 will be later described with reference to the circuit diagram of the testing means.

The solenoid that actuates the narrow tolerance range printer 623 is connected to be energized through switches 625 and 626 arranged adjacent the carts 572 on the near side, as seen in FIG. 24, and six carts ahead of the narrow tolerance printer 623. The switches 625 and 626 are normally open and are connected in series and arranged to be closed by the pins 578 and 580 if they project on the near side of the cart which carries information about the capacitor adjacent the narrow tolerance printer 623. The reason for this arrangement is that if the capacitor under test falls within the narrow tolerance range of capacitance, the pin setting solenoids 620 and 621 are both energized to cause the pins 578 and 580 to project on the near side of the cart, as previously explained.

The solenoid which controls the operation of the broad tolerance range printer 624 is connected to be energized through switches 627 and 628 arranged adjacent the near side of the cart, one cart (station) ahead of the switches 625 and 626 to correspond to the position of the printer 624. Each of the switches 627 and 628 comprises two sections—one normally open and one normally closed—whereby if either switch 627 or 628 is actuated by either pin 578 or 580, the solenoid controlling the broad tolerance range printer 624 is energized to cause that printer to operate. The reason for this arrangement is that if the capacitor under test falls in the broad tolerance range of capacitance on the high side of the standard value, pin setting solenoid 621 is actuated to cause the pin 580 to project on the near side of the cart, whereas if the capacitor falls in the broad tolerance range on the low side of the standard value, pin setting solenoid 620 is actuated to cause the pin 578 to project on the near side of the cart. Thus, if the capacitor falls in either of the two broad tolerance ranges, only one of the pins 578 and 580 will be positioned so as to actuate one of the switches 627 or 628.

After the capacitors have been color coded by one of the printers 623 and 624, they are ready to be discharged or ejected from the testing means in groups according to their electrical characteristics. The capacitor-carrying carts 572 secured to the chain 573 pass around the sprocket 575, as best shown in FIG. 25. The capacitors 38 are prevented from falling out of the carts 572 as they pass around the sprocket 575 by a pair of plates 630 and 631 having curved edges, which are arranged adjacent the sprocket 575 on each side of the carts 572. After the carts have passed around the sprocket 575, the leads 36a, 36b of the capacitors continue to be supported on the edges of the plates 630 and 631 until they pass into the ejecting portion of the apparatus.

Arranged adjacent the end of the plate 630 is a bar 632 on which the lead 36a of each capacitor rests as the capacitors pass beyond the plates 630 and 631. The other leads 36b of each capacitor is supported on a plurality of wires 633–638 which overlap somewhat and are secured to the rotatable shafts of rotary solenoids 640–645, respectively. Arranged below the capacitor-carrying carts 572 and in alignment with the supporting wires 633–638 are a plurality of chutes 646–651, respectively. Thus, if one of the solenoids 640–645 is actuated to lower its corresponding supporting wire 633–638, a capacitor whose lead 36b is resting on the supporting wire will fall into one of the chutes 646–651. The solenoids 640–645 may be provided with conventional counters 640a–645a, respectively, to indicate the number of times each solenoid is actuated. In the present case, a movable belt 652 is provided underneath the chutes 646–651 to carry the capacitors into suitable bins or receptacles. Of course, receptacles or other devices may be provided under each of the chutes 646–651 to receive the capacitors without the use of a movable belt.

The rotary solenoids 640–645 are connected to be energized through switches which are actuated by the pins 578 and 580 on the various carts. As usual, each switch energizes the solenoid located six carts behind the particular cart passing by the switch at the moment. The solenoid 640 is connected to be energized through switches 655 and 656 located adjacent the far side of the cart 572 as seen in FIG. 24; the solenoid 641 is connected to be energized through switches 657 and 658 located adjacent the near side of the cart; the solenoid 642 is connected to be energized through switches 659 and 660 located adjacent the far side of the cart; the solenoid 643 is connected to be energized through switches 661 and 662 adjacent the near side of the cart; the solenoid 644 is connected to be energized through switches 663 and 664 adjacent the far side of the cart; and the solenoid 645 is connected to be energized through switches 665 and 666 adjacent the near side of the cart.

The electrical circuitry of the solenoids 640–645 and switches 655–666 will be later explained in detail. It is sufficient for the present to note that the solenoid 640 is energized if the capacitor has failed under the high potential test; the solenoid 641 is actuated if the capacitor falls in the broad tolerance capacitance range on the high side of the desired value; solenoid 642 is actuated if the capacitor is out of tolerance on the high side of the desired value; solenoid 643 is actuated if the capacitor falls within the narrow tolerance range; solenoid 644 is actuated if the capacitor is out of tolerance on the low side of the desired value; and solenoid 645 is actuated if the capacitor falls in the broad tolerance range on the low side. Thus, the capacitors are discharged onto the moving belt 652 in groups according to their various electrical characteristics.

After all of the capacitors have been discharged from the carts 572 into the chutes 646–651, the empty carts continue to advance toward the sprocket 574. As the carts approach the sprocket, they pass between a pair of converging plates 667 and 668 that serve to reset the pins 578 and 580 to their central or non-information-carrying condition. Each cart is now ready to receive another capacitor from the transfer wheel 561 to repeat the testing, coding, and discharging process.

B. *Electrical circuitry*

1. IN GENERAL

Looking now at the circuit diagram of the testing means shown in FIG. 26, it is seen that power may be supplied to the testing means from a 440 volt, 3-phase line, on conductors 670a, 670b, and 670c. Two of the input power conductors, for example, the conductors 670a and 670b, are connected to energize the operating winding of a relay 671 through a normally open "On" switch 672 and a normally closed "Off" switch 673. When the normally open "On" switch 672 is momentarily closed to energize the operating winding of the relay 671, power is supplied through relay contacts 671a and 671b to energize the primary winding of a transformer 676. The relay contacts 671c serve to short-circuit the normally open "On" switch 672 and seal in the operating winding of the relay 671.

Alternating current power is supplied from the secondary winding of the transformer 676 on conductors 677 and 678 for the remainder of the circuitry to be described. However, when relay 671 is closed and the transformer 676 energized, the circuit is not ready for full operation but is merely in a standby condition.

The testing means is placed in full operation by momentarily closing a normally-open "Start" switch 680. The switch 680 is connected in series with the operating winding of a relay 681 and a normally closed "Stop" switch 682 between the conductors 677 and 678. When the relay 681 is closed, its contacts 681a serve to short circuit the normally open "Start" switch 680 and seal in the relay. Its contacts 681b serve to complete the circuit through several other relays to be described to place the equipment in full operation.

A relay 683 has its operating winding connected between the conductors 677 and 678 through the contacts 681b of the relay 681. Contacts 683a, 683b, and 683c of relay 683 complete the circuit from the 3-phase lines 670a, 670b, and 670c to energize the main drive motor 516 of the testing means.

The operating winding of a relay 684 is also connected between the conductors 677 and 678 through the contacts 681b of relay 681. When the relay 684 is energized, its contacts 684a connect a conventional rectifier bridge 685 between the alternating current conductors 677 and 678 through the normally closed switch 622. Direct current is supplied from the rectifier bridge 685 on conductors 686 and 687 to a capacitance tester 688 which was previously mentioned with reference to FIGS. 24 and 25. The capacitance tester 688 is connected between alternating current lines 677 and 678 by conductors 690 and 691. It will be recalled that the switch 622 is opened if the capacitor under test has failed under the high potential test. Thus, no direct current is supplied to the capacitance tester under those conditions.

The operation of the capacitance tester 688 will be later described in detail with reference to its circuit diagram. It is sufficient for the present note that the pin setting solenoid 617 is connected to the capacitance tester by means of conductors 692 and 693; solenoid 618 is connected to the capacitance tester through conductors 694 and 695; solenoid 620 is connected to the tester through conductors 693 and 696; and solenoid 621 is connected to the tester through conductors 694 and 697.

When the relay 683 closes, as previously mentioned, its contact 683d connect the operating winding of a relay 698 between the alternating current conductors 677 and 678, through the contacts 681b of relay 681, which are already closed, as previously described. Contacts 698a of relay 698 connect a conventional rectifier bridge 900 between the alternating current conductors 677 and 678. The positive potential direct current output of the rectifier bridge 900 is applied to a conductor 701 and the negative potential direct current output of the bridge 900 is applied through the contacts 698b of the relay 698 to a conductor 702.

The positive direct current potential is supplied from the conductor 701 through the operating windings of the pin setting solenoids 607 and 608 previously mentioned to a high potential tester 703 which was mentioned with reference to FIG. 24. The negative direct current potential is also supplied to the high potential tester 703 from the conductor 702. The high potential tester 703 will be later described in detail with reference to its circuit diagram.

The narrow tolerance range color code printer 623 is actuated by a solenoid 704 connected between the direct current lines 701 and 702 through normally open switch 625 and normally open switch 626. The switches 625 and 626, as previously mentioned, are arranged beside the carts 570 on which the capacitors are conveyed through the testing means, and are actuated when the pins 578, 580 on the cart are in a position to indicate that the capacitor under test falls within the narrow tolerance range of capacitance.

The broad tolerance range color code printer 624 is actuated by a solenoid 705. The solenoid 705 is connected between the direct current lines 701 and 702 through a normally closed section 627a of switch 627 and a normally open section 628a of switch 628, or through a normally open section 627b of switch 627 and a normally closed section 628b of switch 628. As previously mentioned with reference to FIG. 24, the switch 627 is actuated if the setting of the pins 578, 580 indicates that the capacitor under test falls within the broad tolerance range on the low side of the desired value and the switch 628 is actuated if the pin setting indicates that the capacitor falls within the broad tolerance range on the high side. If the capacitor under test has failed under the high potential test, the pins are in a position such that neither switch 627 nor switch 628 is actuated, and hence the solenoid 705 is not energized and the broad tolerance range color code printer 624 does not operate. Similarly, if the capacitor under test falls within the narrow tolerance range, both switches 627 and 628 are actuated, but the circuit is not completed through the winding of solenoid 705, and again the high tolerance printer does not operate.

The rotary solenoids 640–645 which, as previously mentioned, cause the capacitors to be discharged or ejected from the testing means in groups according to their electrical characteristics, are connected in series with the switches 655–666, which operate the solenoids. The eject solenoid 640 is connected between the direct current conductors 701 and 702 through normally open switches 655 and 656; the solenoid 641 is connected through normally closed switch 657 and normally open switch 658; solenoid 642 is connected through normally closed switch 659 and normally open switch 660; solenoid 643 is connected through normally open switches 661 and 662; solenoid 644 is connected through normally open switch 663 and normally closed switch 664; and solenoid 645 is connected through normally open switch 665 and normally closed switch 666.

It will be recalled from the previous description of FIGS. 24 and 25 that when a capacitor has failed a high potential test, both the pins 578 and 580 on its information-carrying cart project on the far side of the cart, as seen in FIG. 24. Thus, when the cart passes the switches 655 and 656, both of these switches are closed to energize the solenoid 640 and drop the capacitor down the chute 646.

If the capacitor has successfully passed the high potential test, either switch 655 or 656 may be closed, but not both of them, and so the solenoid 640 is not energized. If the capacitor falls in the broad tolerance capacitance range on the high side of the desired value, the solenoid 621 causes the pin 580 to project on the near side of the cart. Thus, as that cart passes the switches 657 and 658, it will close the switch 658 but leave undisturbed the normally closed switch 657. Thus, the solenoid 641 will be energized to drop that capacitor into the chute 647. If the capacitor has been found to be out of tolerance on the high side, the pin 580 will be caused to project on the far side of the cart by the pin setting solenoid 618. Thus, when the cart passes the switches 659 and 660, the pin 580 closes switch 660 but leaves undisturbed the normally closed switch 659. Thus, solenoid 642 is actuated to drop the capacitor into chute 648.

If the capacitor is found to fall in the narrow tolerance range, both pin setting solenoids 620 and 621 are energized to cause the pin 578 and 580 to project on the near side of the cart. When the cart passes switches 661 and 662, the pins close both switches, thus energizing solenoids 643 to drop the capacitor into the chute 649. If the capacitor tests outside of the tolerance range on the low side, the pin setting solenoid 617 moves the pin 578 to project on the far side of the cart. Thus, as the cart passes the switches 663 and 664, the switch 663 is closed and normally closed switch 664 is left undisturbed. Thus, solenoid 644 is actuated to drop the capacitor into chute 650. If the capacitor is found to be within the broad tolerance range on the low side of the desired value, the pin setting solenoid 620 causes the pin 578 to project on the near side of the cart. Thus, as the cart passes the switches 665 and 666, the switch 665 is closed and normally closed switch 666 is not actuated. Thus, solenoid 645 is energized to drop the capacitor into chute 651.

It is apparent that various arrangements of the solenoids, switches, and information-carrying pins may be made. Such arrangements and variations are considered to be apparent to one skilled in the art and need no special description.

It is also apparent that numerous interlocks, indicator lights, and the like, may be provided in the testing means. However, for the sake of simplicity, all such modifications have been omitted from the circuit diagram. The addition of such features is believed to be within the scope of one skilled in the art without further description.

2. THE HIGH POTENTIAL TESTER

Figure 27:
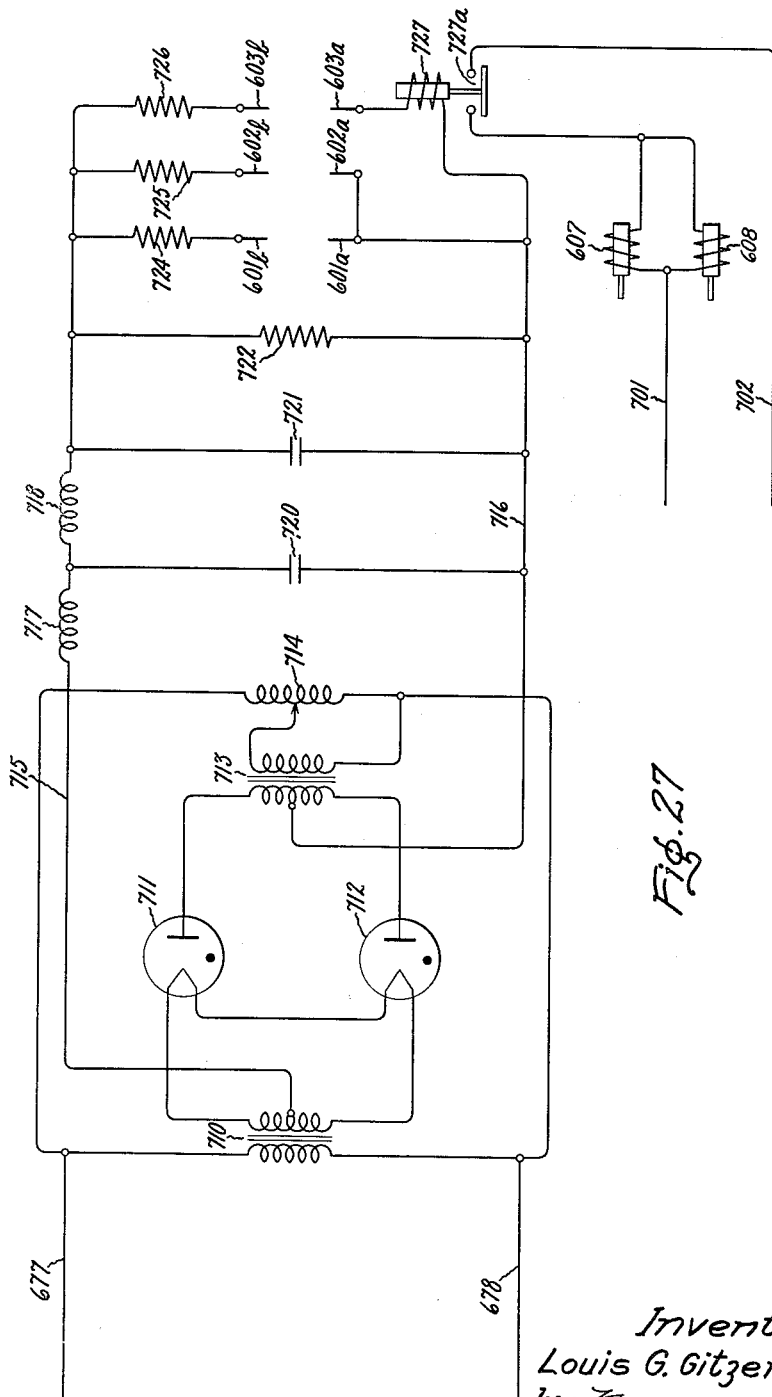
FIG. 27 is a circuit diagram of the high potential testing means embodied in the circuit of FIG. 26.

Referring now to FIG. 27, which is a circuit diagram of the high potential tester, it is seen that the tester is energized from the alternating current conductors 677 and 678, as previously mentioned. The conductors 677 and 678 are connected to the primary winding of a transformer 710 whose secondary winding is connected to energize the series connected filaments of a pair of gas-filled rectifier tubes 711 and 712. The rectifiers 711 and 712 may be of the conventional thyratron type, such as type 816.

The anodes of the rectifiers 711 and 712 are connected to the opposite ends of the secondary winding of a transformer 713 whose primary winding is energized from an auto-transformer 714 connected between the alternating current conductors 677 and 678. The direct voltage produced by the full wave rectifier arrangement of the rectifiers 711 and 712 appears between conductors 715 and 716 connected to the center taps of the secondaries of transformers 710 and 713, respectively.

The direct voltage appearing between the conductors 715 and 716 is filtered by a conventional choke input double section filter comprising chokes 717 and 718 and capacitors 720 and 721. The direct voltage appears across a load resistor 722 connected between the conductors 715 and 716.

It will be recalled that each capacitor is subjected to three applications of high potential taking place in successive stations as the capacitor moves along on its cart. The first applications occurs when the capacitor contacts the conductor leads 601a and 601b. The second application occurs when the capacitor leads come into contact with the conductors 602a and 602b. The third application occurs when the capacitor under test comes into contact with the conductors 603a and 603b.

The conductors 601b, 602b, and 603b are connected to the positive potential conductor 715 through resistors 724, 725, and 726, respectively, having relatively high values of resistance. The purpose of the resistors 724, 725, and 726 is to prevent a drop in the potential applied to the other two capacitors under test, if one of the three capacitors being simultaneously tested breaks down under the high potential.

The conductors 601a and 602a are connected directly to the negative potential conductor 716. The conductor 603a is connected to the negative potential conductor through the energizing winding of a relay 727 whereby if the capacitor under test breaks down and current flows through the conductors 603a and 603b, the relay 727 is energized to close its contacts 727a. When the contacts 727a of relay 727 close, the operating windings of the pin setting solenoids 607 and 608 are energized from the direct current conductors 701 and 702, previously mentioned. Thus, the pins 578 and 580 on the information-carrying cart corresponding to the capacitor in contact with the conductors 603a and 603b are set to indicate a high potential failure.

3. THE CAPACITANCE TESTER

The circuit diagram of the capacitance tester 688 is shown in FIG. 28. Alternating current power is supplied to the capacitance tester from the conductors 690 and 691 previously mentioned, which are connected to the input of a conventional power supply 800. The power supply 800 serves to provide direct current power for the various components of the tester to be hereafter described.

The capacitance tester comprises an oscillator 801 for providing an alternating voltage for testing each capacitor at a desired frequency. The output of the oscillator 801 may be amplified by a conventional alternating current amplifier 802 and then supplied to the primary winding 803a of a transformer 803.

The transformer 803 has five secondary windings, 803b, 803c, 803d, 803e, and 803f. The secondary winding 803b is connected to energize an alternating current bridge designated generally by the numeral 804. The bridge 804 comprises a pair of fixed resistors 805 and 806 of equal value arranged as adjacent arms of the bridge having their outer ends connected across the secondary winding 803b and the point 807 between the two resistors 805 and 806 grounded. The other two arms of the bridge comprise a standard capacitor 808 and the capacitor 38 under test. The test capacitor 38 is connected into the bridge through the conductors 610a and 610b previously mentioned with reference to FIG. 24.

The standard capacitor 808 may be replaced by a capacitor network, if desired, which comprises a plurality of standard capacitors arranged to be switched into and out of the current by an operator to obtain various values of standard capacitance.

A pair of potentiometers 810 and 811 are connected in parallel from a point on the resistor 805 to ground, and a pair of potentiometers 812 and 813 are similarly connected from a point on the resistor 806 to ground. The purpose of the potentiometers 810, 811, 812, and 813 will become apparent hereafter.

The output of the bridge 804 is taken from a point 814 between the standard capacitor 808 and the capacitor 38 under test and is supplied to the inputs of four cathode followers 815, 816, 817, and 818, which serve as decoupling amplifiers between the bridge 804 and circuitry to be hereafter described. The circuits following each of the cathode followers 815, 816, 817, and 818 are identical and, therefore, only one such circuit will be described with reference to the cathode follower 815.

The output voltage from the cathode follower 815 is supplied to a conventional alternating current amplifier 820 to which is also supplied the voltage taken from the movable contact arm of one of the potentiometers 810, 811, 812, or 813—in this case, the potentiometer 813. The voltage from the potentiometer 813 and the voltage from the cathode follower 815 are applied in series to the amplifier 820 which algebraically adds the two voltages. It is understood that the voltages from the potentiometers 810, 811, and 812 are algebraically added to the voltages from the cathode followers 816, 817, and 818, respectively, by three other amplifiers (not shown) similar to the amplifier 820.

The output of the amplifier 820 is supplied to opposite points 821 and 822 of a demodulator bridge 823 in which the rectifiers are connected in ring fashion. A pair of series-connected resistors 824 and 825 are also connected across the output of the amplifier 820, and the point 826 between the resistors 824 and 825 is connected to ground through the operating winding 827a of a three-position relay 827. When current flows through the operating winding 827a of relay 827 to ground, the armature 827b of the relay engages contact 827c, and when current flows through the operating winding 827a in the reverse direction, the armature 827b engages the contact 827d. The armature 827b is normally in the center position as shown.

The remaining opposite points 828 and 829 of the bridge 823 are connected to the secondary winding 803c of the transformer 803. A resistor 830 whose center tap is grounded is also connected between the points 828 and 829 of the rectifier bridge 823.

If the capacitor 38 under test differs in capacitance from the standard capacitor 808, alternating voltage appears between the point 814 and the grounded point 807. As is well known, the amplitude of that voltage and its phase depend on the amount of unbalance of the bridge and whether the capacitor 38 is larger or smaller than the standard capacitor 808. For example, if the capacitor 38 under test has a lower value of capacitance than the standard capacitor 808, a voltage appears between the bridge points 814 and 807 which has a certain amplitude and is in phase with the voltage supplied to the bridge from the transformer secondary winding 803b. If, on the other hand, the capacitance of the test capacitor 38 is greater than that of the standard capacitor 808, the voltage appearing between the points 814 and 807 is out-of-phase with the voltage applied to the bridge.

As previously mentioned, the voltage appearing between the bridge points 814 and 807 is compared with voltages taken from the potentiometers 810, 811, 812, and 813. The voltages taken from the potentiometers 810 and 811 represent the limits of the narrow tolerance range of capacitance and the broad tolerance range of capacitance, respectively, on the high side of the standard capacitor value. That is, if the capacitance of the test capacitor 38 differs from that of the standard capacitor by a certain amount, say +2 percent, which is assumed to be the limit of the narrow tolerance range on the high side, a voltage having a certain amplitude appears between the points 814 and 807. The movable arm of potentiometer 810 is set to provide a voltage of that same amplitude but of opposite phase. Potentiometer 811 provides a voltage equal in amplitude and opposite in phase to that voltage appearing between points 814 and 807 when the test capacitor value departs from that of the standard capacitor by the percentage equal to the broad tolerance range limit on the high side of the standard value, for example, +10 percent. Similarly, the potentiometers 812 and 813 provide voltages that represent the limits of the narrow tolerance and broad tolerance capacitance ranges, respectively, on the low side of the standard capacitance value.

The operation of the capacitance tester depends upon the relationship between the various tolerance range limit voltages taken from the potentiometers 810–813 and the bridge unbalance voltage taken from the point 814. If, in each of the four channels comprising an amplifier 820 and a demodulator bridge 823, the bridge unbalance voltage (point 814) is in phase with the tolerance range limit voltage (potentiometers 810–813) or is out of phase with the tolerance range limit voltage but of less amplitude, the voltage appearing across the resistors 824, 825 is in phase with the tolerance range limit voltage. Conversely, if the bridge unbalance voltage is out of phase with the tolerance range limit voltage and has greater amplitude, the voltage across resistors 824, 825 is out of phase with the tolerance range limit voltage.

The operation of the circuit can best be explained by assuming that the capacitance value of the test capacitor 38 deviates from that of the standard capacitor 808 by a certain percentage of the standard value. Therefore, assume that the capacitance of the test capacitor 38 is 8 percent less than the value of the standard capacitance 808, and that this value falls within the predetermined limits of the broad tolerance range on the low side. In this case, the bridge unbalance voltage appearing between the bridge points 814 and 807 is in phase with the voltage applied to the bridge 804 from transformer winding 803b, and the voltage taken from the potentiometer 813, which corresponds to the limit of the broad tolerance range on the low side, is out of phase with the bridge unbalance voltage and of greater amplitude.

The voltage appearing between the points 814 and 807 passes through the cathode follower 815 and is supplied to the input of the alternating current amplifier 820. The voltage taken from the movable arm of potentiometer 813 is also supplied to the input of the amplifier 820 in series with the bridge unbalance voltage. Therefore, the amplifier 820 algebraically adds the two voltages to provide a relatively small output voltage that is out-of-phase with the bridge input voltage from the transformer secondary winding 803b.

The function of the ring demodulator bridge 823 is to compare the phase of the output voltage of the amplifier 820 with the phase of a reference voltage supplied from one of the secondary windings 803c, 803d, 803e, 803f of the transformer 803. If the two voltages applied to the rectifier bridge 823 have one phase relationship, the point 826 is positive with respect to ground, and current flows to ground through the operating winding 827a of relay 827; if the phase relationship between the voltages is reversed, the point 828 is negative with respect to ground and current flows through the winding 827a in the other direction. Thus, the armature 827b of relay 827 engages either contact 827c or contact 827d, depending on the phase relationship between the input voltages to the bridge 823.

The theory and operation of ring demodulators such as bridge 823 are well known in the art, and only a brief explanation is deemed necessary. Consider first that during one half-cycle of the alternating current output voltage of the amplifier 820, the bridge point 821 is positive while the point 822 is negative, and that at the same time, the voltage across the opposite bridge points 828 and 829 from the transformer secondary winding 803c is such that the point 828 is positive while the point 829 is negative. Under those conditions, assuming that the voltage drop across all the rectifiers comprising the bridge 823 is the same, the point 822 is maintained at ground potential because of the grounded center tap of resistor 830. Thus, the point 828, and hence the point 826, are positive with respect to ground and current flows through the operating winding 827a of relay 827 from the point 826 to ground to cause the armature 827b to engage the contact 827c.

On the other half cycle of the alternating current input voltages, the bridge point 821 is held at ground potential, and hence the point 826 is again positive with respect to ground. Thus, the armature 827b of relay 827 continues to engage contact 827c.

Conversely, if the phases of the input voltages to the demodulator bridge 823 are such that the point 821 is positive while the point 822 is negative, and the point 829 is positive while the point 828 is negative, point 821 is held at ground potential making the point 826 negative with respect to ground. Thus, current flows from ground to point 826 through the operating winding 827a of the relay 827, and armature 827b engages contact 827d. Similarly, during the other half cycle, the point 822 is held at ground potential and the point 826 is negative relative thereto so that the relay 827 remains in the same condition.

It was previously assumed, for purposes of illustration, that the output voltage from amplifier 820 is out-of-phase with the input voltage to the bridge 804, when the test capacitor value is greater than the limit of the broad tolerance range on the low side of the standard value. If the reference voltage from transformer secondary winding 803c is connected to the bridge 823 so that point 828 is positive when point 821 is positive, the point 826 is positive and relay armature 827b engages contact 827c. If the value of the capacitor 38 under test falls below the broad tolerance range on the low side, the output voltage from amplifier 820 is out-of-phase with the input voltage to the bridge 804. Hence, point 829 is positive when point 821 is positive, causing point 826 to be negative. In that case, the relay 827 is actuated to cause armature 827b to engage contact 827d rather than contact 827c. That action, as will be pointed out in detail hereafter, affects the various pin setting relays which operate to indicate the tolerance range of the capacitor 38 under test.

It is apparent, of course, that the reference voltage taken from transformer secondary winding 803c must initially be arranged to provide operation of the relay 827 in the manner noted above.

The cathode followers 815, 816, 817, and 818 each supply the voltage from the bridge point 814 to an amplifier (not shown) similar to the amplifier 820 and the output of each amplifier is supplied to a demodulator bridge (not shown) similar to the demodulator bridge 823. Each demodulator bridge controls the action of a relay in the manner previously described with reference to relay 827. In FIG. 28, the other relays are designated 831, 832, and 833.

The phases of the input voltages to the demodulator bridge for the relay 831 are so arranged that when the value of the test capacitor 38 is higher than the limit of the narrow tolerance range on the low side of the desired value, current flows through the operating winding 831a to ground causing armature 831b to engage contact 831c. If, on the other hand, the value of the test capacitor is lower than the limit of the narrow tolerance range, that is, outside the narrow tolerance range on the low side, current flows from ground through the winding 831a causing armature 831b to engage contact at 831d.

Similarly, relay 832 responds to those values of capacitance that are higher than the limit of the narrow tolerance range on the high side, i.e., if the capacitor under test has a value higher than that limit, current flows through the operating winding 832a to ground causing armature 832b to engage contact 832c. If the test capacitor has less capacitance than the limit of the narrow tolerance range on the high side, current flows in the opposite direction through the winding 832a causing armature 832b to engage contact with 832d. Relay 833 responds to capacitors which lie within the broad tolerance range on the high side. If the test capacitor has higher capacitance than the limit of the broad tolerance range on the high side of the standard value, that is, is out of tolerance, current flows through operating winding 833a to ground causing armature 833b to engage contact 833c. If the capacitor under test has lower capacitance than the limit of the broad tolerance range on the high side, current flows in the reverse direction through winding 833a causing armature 833b to engage contact 833d.

As an example, assume again that the capacitor under test has a value that lies within the broad tolerance range on the low side. Thus, the capacitance value is lower than the limits of both of the high tolerance ranges and the narrow low tolerance range but higher than the limit of the broad low tolerance range. Hence, the armature 827b of relay 827 engages contact 827c but all of the other relays are actuated in the opposite direction. The relay 831 corresponding to the narrow low tolerance range is actuated to cause armature 831b to engage contact 831d. Similarly, the relay 832 corresponding to the narrow high tolerance range is actuated to cause its armature 832b to engage contact 832d, and the relay 833 which represents the broad high tolerance range is actuated to cause armature 833b to engage contact 833d.

It will be recalled from the description of FIG. 26 that direct potential is supplied to the capacitance tester on the conductors 686 and 687. Thus, it is seen from FIG. 28 that the circuit is completed between the two conductors 686 and 687 in the following manner when the test capacitor falls within the broad low tolerance range as set forth above: from conductor 686 through relay armature 827b and contact 827c, through the operating winding of the pin setting solenoid 620, through conductor 698, armature 832b and contact 832d of relay 832, and through contact 833d and armature 833b of relay 833 to the other conductor 687. Thus, it is apparent that the only pin setting solenoid energized under the given condition is solenoid 620 which, as previously described, sets the pin 578 to indicate a capacitor that falls within the broad tolerance range on the low side of the standard value.

If the capacitor under test has a capacitance value such that it falls outside the broad tolerance range on the low side, the relays 831, 832, and 833 remain in the same condition as previously described when the capacitor fell within the broad tolerance range on the low side. In the present case, however, relay 827 is actuated to cause armature 827b to engage contact 827d rather than contact 827c. Thus, the path of current flow from conductor 686 is through armature 827b and contact 827d of relay 827, through the operating winding of pin setting solenoid 617, through conductor 698, armature 832b and contact 832d of relay 832, and through contact 833d and armature 833b of relay 833 to the other conductor 687. Thus, the pin setting solenoid 617 is the only one actuated.

If the capacitor under test falls within the narrow tolerance range, the relay 827 is actuated so that its armature 827b engages contact 827c indicating the value of the test capacitor is higher than the limit of the broad low tolerance range. Similarly, relay 831 is actuated so that its armature 831b engages contact 831c. Relay 832 is actuated so that its armature 832b engages contact 832d and relay 833 is actuated so that its armature 833b engages contact 833d indicating that the capacitor has a value lower than the limits of the narrow high and broad high tolerance ranges. Thus, the path of current flow from conductor 686 is through armature 827b and contact 827c of relay 827, through the operating winding of pin setting solenoid 620, through conductor 698, armature 832b and contact 832d of relay 832, through contact 833d and armature 833b of relay 833 to conductor 687. Current also flows from conductor 686 through armature 827b and contact 827c of relay 827, through contact 831c and armature 831b of relay 831, through conductor 700 and the operating winding of pin setting solenoid 621, and through contact 833d and armature 833b of relay 833 to the conductor 687. It will be recalled that the pin setting solenoids 620 and 621 are those actuated to indicate a capacitor that falls within the narrow tolerance band.

When the capacitor under test falls in the broad high tolerance range, the relays 827, 831 and 832 indicate that the value of the capacitor is higher than the limits of the broad low, narrow low, and narrow high tolerance ranges, respectively. The relay 833 indicates that the value of the capacitor is lower than the limit of the broad high tolerance range. Thus, the path of the current flow from the conductor 686 is through armature 827b and contact 827c of relay 827, through contact 831c and armature 831b of relay 831, through conductor 700 and through the actuating winding of pin setting solenoid 621, and through contact 833d and armature 833b of relay 833 to conductor 687.

When the value of the capacitor under test lies above the limit of the broad high tolerance range, the conditions of relays 827, 831, and 832 remain the same as for the capacitor that falls within the broad high tolerance range, but the relay 833 has its condition changed to indicate that the capacitor is not within its range. Thus, under those conditions, the path of current flow from the conductor 686 is through armature 827b and contact 827c of relay 827, through contact 831c and armature 831b of relay 831, through conductor 700 and the operating winding of pin setting relay 618, through conductor 701 and through contact 833c and armature 833b of relay 833 to the conductor 687. It will be recalled from the previous description of FIG. 24 that when a capacitor falls outside the broad high tolerance range the pin setting relay 618 is actuated.

While I have described certain specific embodiments of my invention, I wish it to be understood that I desire to protect in the following claims all changes or modifications thereto which fall within the spirit and scope of those claims.

What I claim as new and desire to secure by Letters Patent of the United States is:

1. In apparatus for manufacturing electrical capacitors from glass strips and metallic conductive plates, the combination of a pallet on which said capacitors are to be assembled, means for positioning a strip of glass on said pallet, means for cutting a roll of metallic foil to provide a plurality of metallic conductive plates, means for positioning said plurality of metallic conductive plates on said strip of glass in spaced side by side relationship, and means for actuating sequentially said glass positioning means, said plate cutting means and said plate positioning means to stack a predetermined number of alternate layers of glass strips and metallic conductive plates on said pallet.

2. In apparatus for manufacturing electrical capacitors, the combination of a pallet on which said capacitors are assembled, means for providing a strip of glass from a glass ribbon and positioning said strip on said pallet, means for cutting a plurality of metallic conductive plates from a strip of foil, means for positioning said conductive plates in side by side relationship on said glass strip, and means for actuating sequentially said glass positioning means, said conductive plate cutting means and said conductive plate positioning means to stack a predetermined number of alternate layers of glass strips and metallic conductive plates on said pallet.

3. In apparatus for manufacturing electrical capacitors, the combination of a pallet upon which the said capacitors are assembled, means for providing and positioning a strip of dielectric material on said pallet, means for providing a plurality of conductive plates, movable means for transferring said plates from said plate providing means and positioning said plates in spaced side by side relationship on said dielectric strip, means for sequentially actuating said strip providing means, said plate providing means and said plate transferring means to stack alternate layers of dielectric strips and conductive plates on said pallet, each said layer of conductive plates comprising a plurality of said plates arranged in side by side relationship, and means associated with said transferring means for varying alternate movements thereof whereby alternate layers of said conductive plates extend over the edges of said dielectric strips in one direction and intermediate layers of said plates extend over the edges of said strips in the opposite direction.

4. In apparatus for manufacturing electrical capacitors, the combination of a pallet on which said capacitors are assembled, means for providing and positioning a strip of dielectric material on said pallet, means for providing a plurality of conductive plates, means movable between said plate providing means and said strip providing means for transferring said plates from said plate providing means and positioning said plates in spaced side by side relationship on said dielectric strip, means for sequentially actuating said strip providing means, said plate providing means and said plate transferring means to stack alternate layers of dielectric strips and conductive plates on said pallet, each said layer of conductive plates comprising a plurality of said plates arranged in side by side relationship, and means associated with said transferring means for shortening alternate movements of said transferring means towards said strip of dielectric material, whereby alternate layers of said conductive plates extend over the edges of said dielectric strips in one direction and intermediate layers extend over the edges of said plates in the opposite direction.

5. In apparatus for manufacturing electrical capacitors, the combination of a pallet on which said capacitors are assembled, means for providing and positioning a strip of dielectric material on said pallet, means for providing a plurality of conductive plates, reciprocating means movable between said plate providing means and said strip providing means for transferring said plates from said plate providing means to said dielectric strip to position said plates in spaced side by side relationship on said strip, means for sequentially actuating said strip providing means, said plate providing means and said plate transferring means to alternate layers of dielectric strips and conductive plates on said pallet, each said layer of metallic conductive plates comprising a plurality of said plates arranged in side by side relationship, fixed stop means for limiting movement of said transferring means toward said strip of dielectric material, and movable stop means for interrupting movement of said transferring means short of said fixed stop means on alternate movements of said transferring means, whereby alternate layers of said conductive plates extend over the edges of said dielectric strips in one direction and intermediate layers extend over the edges of said plates in the opposite direction.

6. In apparatus for manufacturing electrical capacitors, the combination of a pallet on which said capacitors are assembled, means for providing and positioning a strip of dielectric material on said pallet, means for cutting a plurality of metallic conductive plates from a plurality of strips of metallic foil, adjustable means for determining the length of said metallic conductive plates, means for positioning said plurality of metallic plates on said dielectric strip in side by side relationship, and means for actuating sequentially said strip positioning means, said plate cutting means and said plate positioning means to stack to a predetermined number of alternate layers of dielectric strips and metallic conductive plates on said pallet.

7. In apparatus for manufacturing electrical capacitors, the combination of a pallet on which said capacitors are assembled, means for providing and positioning a strip of dielectric material on said pallet, means for cutting a plurality of metallic conductive plates from a plurality of strips of metallic foil, adjustable means for determining the length of said metallic conductive plates, movable means for positioning said plurality of metallic plates on said dielectric strip in side by side relationship, means for actuating sequentially said strip positioning means, said plate cutting means and said plate positioning means to stack a predetermined number of alternate layers of dielectric strips and metallic conductive plates on said pallet successive layers of said metallic conductive plates extending over the edges of said dielectric strips in opposite directions, and adjustable means for controlling the extent of movement of said movable means to determine the amount that said conductive plates extend over said edges of said dielectric strips independently of said length determining means.

8. In apparatus for manufacturing electrical capacitors, the combination of means for cutting a plurality of metallic conductive plates from a plurality of strips of metallic foil, and means for supporting and advancing said strips of metallic foil toward said cutting means, said advancing means comprising a bar over which said strips extend and a resilient member arranged adjacent said bar with said strips of foil extending therebetween, a depending lip on said resilient member for engaging said strips to remove slack therefrom as said resilient member moves toward said bar, means for moving said resilient member toward said bar, and means for moving said bar and said resilient member toward said cutting means when said strips are clamped between said resilient member and said bar.

9. In apparatus for manufacturing electrical capacitors, the combination of means for forming simultaneously a plurality of conductive plates from a roll of conductive material, and stacking means comprising receiving means, means or moving a ribbon of dielectric material into stacking position on said receiving means and dividing a strip of dielectrical material from said ribbon, means for transporting said conductive plates, and means for actuating in order said ribbon moving and dividing means and said conductive plate forming and transporting means to stack a predetermined number of alternate layers of said dielectric strips and said conductive plates layer upon layer, said plate transporting means including means for positioning said conductive plates in each layer in spaced side by side relationship.

10. In apparatus for manufacturing electrical capacitors, the combination of means for forming simultaneously a plurality of conductive plates from a roll of conductive material, and stacking means comprising receiving means, means for moving a ribbon of glass into stacking position on said receiving means and dividing a strip of glass from said ribbon, means for transporting said conductive plates, and means for actuating in order said ribbon moving and dividing means and said conductive plate forming and transporting means to stack a predetermined number of alternate layers of said glass strips and said conductive plates layer upon layer, said plate transporting means including means for positioning said conductive plates in each layer in spaced side by side relationship.

11. In apparatus for manufacturing electrical capacitors, the combination of means for forming a plurality of conductive plates from a plurality of conductive ribbons, and stacking means comprising receiving means, means for moving a ribbon of dielectric material into stacking position on said receiving means and dividing a strip of dielectric material from said ribbon, means for transporting said conductive plates, and means for actuating in order said ribbon moving and dividing means and said conductive plate forming and transporting means to stack a predetermined number of alternate layers of said dielectric strips and said conductive plates layer upon layer, said plate transporting means including means for positioning said conductive plates in each layer in spaced side by side relationship.

12. In apparatus for manufacturing electrical capacitors, the combination of means for forming a plurality of conductive plates from a plurality of conductive ribbons, and stacking means comprising receiving means, means for moving a ribbon of glass into stacking position on said receiving means and dividing a strip of glass from said ribbon, means for transporting said conductive plates, and means for actuating in order said ribbon moving and dividing means and said conductive plate forming and transporting means to stack a predetermined number of alternate layers of said glass strips and said conducting plates layer upon layer, said plate transporting means including means for positioning said conductive plates in each layer in spaced side by side relationship.

13. In apparatus for manufacturing electrical capacitors, the combination of means for forming a plurality of conductive plates from a plurality of conductive ribbons, and stacking means comprising receiving means, means for moving a ribbon of dielectric material into stacking position on said receiving means and dividing a strip of dielectric material from said ribbon, means for transporting said conductive plates, and means for actuating in order said ribbon moving and dividing means and said conductive plate forming and transporting means to stack a predetermined number of alternate layers of said dielectric strips and said conductive plates layer upon layer, said plate transporting means including means for positioning said conductive plates in each layer in spaced side by side relationship, corresponding conductive plates of each layer of said plates being aligned and alternate layers of said conductive plates extending over the edges of said dielectric strips in one direction and intermediate layers of said conductive plates extending over the edges of said dielectric strips in the other direction.

14. In apparatus for manufacturing electrical capacitors, the combination of means for forming a plurality of conductive plates from a plurality of conductive ribbons, and stacking means comprising receiving means, means for moving a ribbon of dielectric material into stacking position on said receiving means and dividing a strip of dielectric material from said ribbon, means for transporting said conductive plates, means for actuating in order said ribbon moving and dividing means and said conductive plate forming and transporting means to stack a predetermined number of alternate layers of said dielectric strips and said conductive plates layer upon layer, said plate transporting means including means for positioning said conductive plates in each layer in spaced side by side relationship, corresponding conducting plates of each layer of said plates being aligned and alternate layers of said conductive plates extending over the edges of said dielectric strips in one direction and intermediate layers of said conductive plates extending over the edges of said dielectric strips in the other direction, and means associated with said transporting means for adjusting the amount that said plates extend over the edges of said dielectric strips.

References Cited in the file of this patent

UNITED STATES PATENTS

| | | |
|---|---|---|
| 1,254,690 | Hazard | Jan. 29, 1918 |
| 1,740,177 | Horton et al. | Dec. 17, 1929 |
| 2,016,455 | Purdy | Oct. 8, 1935 |
| 2,052,243 | Ostermier | Aug. 25, 1936 |
| 2,335,714 | Voigtmann | Nov. 30, 1943 |
| 2,352,926 | Weiss | July 4, 1944 |
| 2,353,405 | King | July 11, 1944 |
| 2,362,691 | Gaiser | Nov. 14, 1944 |
| 2,389,420 | Deyrup | Nov. 20, 1945 |
| 2,416,101 | Kennedy | Feb. 18, 1947 |
| 2,419,484 | Danziger | Apr. 22, 1947 |
| 2,440,347 | Poitras | Apr. 27, 1948 |
| 2,526,704 | Bair | Oct. 24, 1950 |
| 2,531,389 | Brandt | Nov. 28, 1950 |
| 2,613,929 | Sullivan | Oct. 14, 1952 |
| 2,679,317 | Roop | May 25, 1954 |
| 2,734,627 | Shields | Feb. 14, 1956 |
| 2,734,628 | Schlayer | Feb. 14, 1956 |
| 2,771,992 | Artingstall et al. | Nov. 27, 1956 |

FOREIGN PATENTS

| | | |
|---|---|---|
| 1,051,464 | France | Sept. 16, 1953 |
| 1,051,465 | France | Sept. 16, 1953 |